(12) United States Patent
Onuma et al.

(10) Patent No.: US 6,961,447 B2
(45) Date of Patent: Nov. 1, 2005

(54) IMAGE MONITORING METHOD, IMAGE MONITORING APPARATUS AND STORAGE MEDIA

(75) Inventors: Chieko Onuma, Iwama (JP); Yoshiki Kobayashi, Hitachi (JP); Hisao Oodawa, Hitachinaka (JP); Hiroshi Shojima, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 685 days.

(21) Appl. No.: 10/079,501

(22) Filed: Feb. 22, 2002

(65) Prior Publication Data

US 2002/0154791 A1 Oct. 24, 2002

(30) Foreign Application Priority Data

Mar. 2, 2001 (JP) .......................... 2001-059177

(51) Int. Cl.[7] .......................... G06K 9/00; G06K 9/36; G06K 9/46; H04N 7/18
(52) U.S. Cl. .......................... 382/103; 382/107; 382/236; 348/154; 348/155
(58) Field of Search .......................... 382/103, 107, 382/236; 348/148, 152, 153, 154, 155

(56) References Cited

U.S. PATENT DOCUMENTS

| | | | | |
|---|---|---|---|---|
| 4,737,847 A | * | 4/1988 | Araki et al. ................. | 348/161 |
| 5,243,418 A | * | 9/1993 | Kuno et al. ................. | 348/155 |
| 5,790,686 A | * | 8/1998 | Koc et al. ................... | 382/107 |
| 6,020,926 A | * | 2/2000 | Astle ....................... | 375/240.24 |
| 6,028,626 A | | 2/2000 | Aviv | |
| 6,104,831 A | * | 8/2000 | Ruland ....................... | 382/173 |
| 6,323,897 B1 | * | 11/2001 | Kogane et al. ............. | 348/159 |
| 6,507,366 B1 | * | 1/2003 | Lee ............................ | 348/352 |
| 6,674,905 B1 | * | 1/2004 | Matsugu et al. ............ | 382/199 |

FOREIGN PATENT DOCUMENTS

| | | |
|---|---|---|
| JP | 8-50649 | 2/1996 |
| JP | 2000-20857 | 1/2000 |

* cited by examiner

*Primary Examiner*—Jon Chang
*Assistant Examiner*—Anthony Mackowey
(74) *Attorney, Agent, or Firm*—Dickstein Shapiro Morin & Oshinsky LLP

(57) ABSTRACT

In order to detect abnormal objects with a low-cost arrangement at high speeds while avoiding unwanted influence of variations of a light source and/or regularly vibrating objects in the environment concerned, there is provided a block data calculation unit 4200 inputted from a camera into blocks, an object candidate extraction unit 4700 which compares image data of a frame to be processed and the immediately preceding frame in units of blocks to thereby extract an abnormal object candidate in accordance with the presence or absence of edges and a longitude-to-lateral edge ratio change rate, and an object judging unit 4800 for determining or "judging" whether the abnormal object candidate is a true abnormal object, wherein it is an abnormal object where movement of the abnormal object candidate is traceable for a prespecified length of time period.

10 Claims, 20 Drawing Sheets

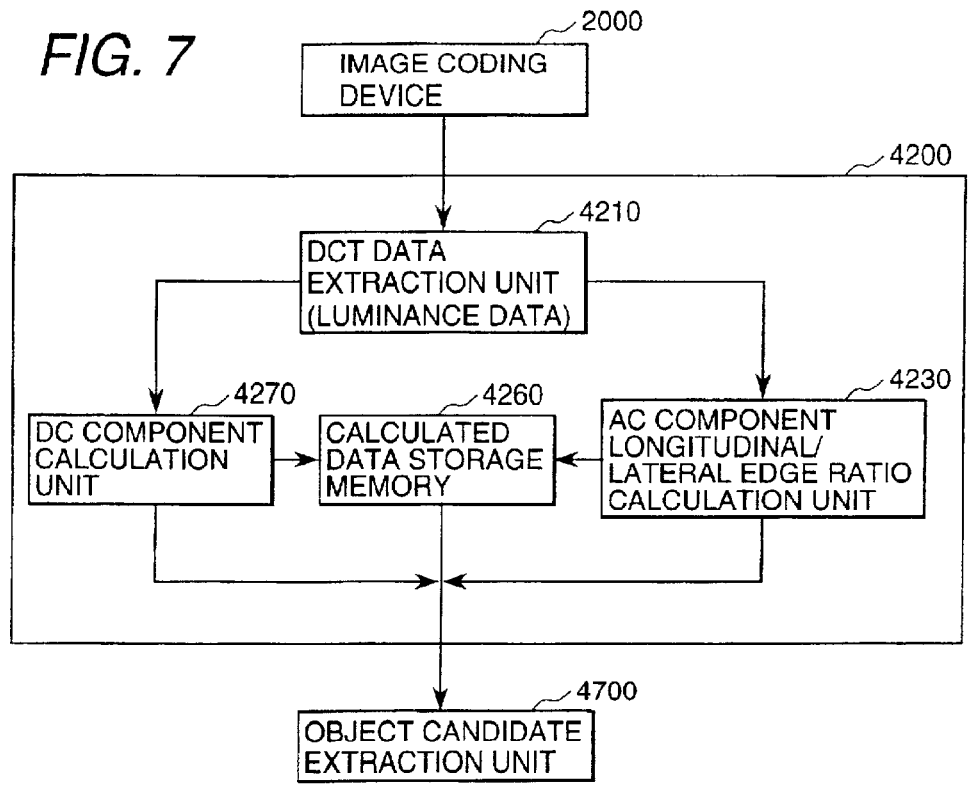
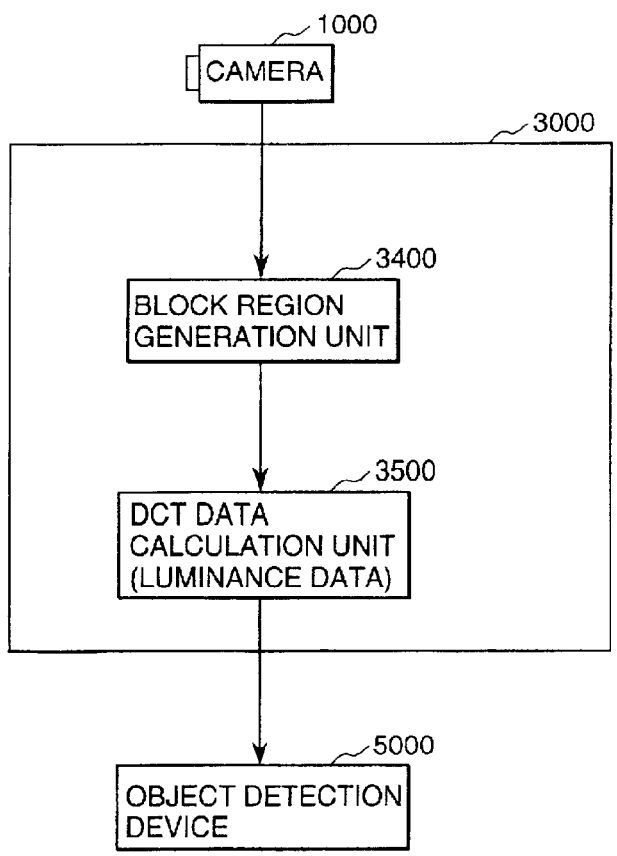

IMAGE MONITORING METHOD, IMAGE MONITORING APPARATUS AND STORAGE MEDIA

BACKGROUND OF THE INVENTION

The present invention relates in general to technologies for monitoring scenes to be monitored as captured or photographed by cameras in the events of surveillance in road transportation monitoring fields and private surveillance within buildings plus outdoor surveillance or the like. More particularly, but not exclusively, this invention relates to a method and apparatus for monitoring of images to detect abnormalities through image processing of image data of scenes being monitored. The invention also relates to storage media for storing therein computer programs used to realize the image monitoring methodology.

As prior known image monitoring or surveillance apparatus, there is a method for performing abnormality detection through the steps of coding an image as captured or "photographed" by a camera into compressed data involving with-time differential image components and then directly utilizing such with-time differential images in this compressed data with no extra modifications added thereto to thereby determine or "judge" whether a change occurs in the to-be-monitored image (Japanese Patent Application Laid-open No. 2000-20857).

Unfortunately this method is encountered with a problem that under the circumstances with luminance variations with time such as brightness changes due to flickering of fluorescent lamps and/or turn-on/off of illumination devices and daylight variation of sunlight and clouds or the like, these can be detected as abnormalities incorrectly. In addition, due to the fact that tree swing with regular vibration in a direction of movement or alternatively curtain movements or else causes the luminance to change with time, the use of this method would result in incorrect detection of them as abnormalities in some cases.

Another abnormality detection method has been proposed until today, which includes the steps of subdividing an image as photographed by a camera into a plurality of blocks, applying discrete cosine transformation and compression processing to a respective of such blocks for forward transmission, expanding only high-frequency components containing therein edge information of the compressed image thus transferred, and using a difference between it and a prestored background scene image to perform the intended abnormality detection (JP-A-8-50649).

This method, however, suffers from problems which follow: The need for extension or "decompression" of such once-compressed image results in an unwanted increase in image information when compared to the case of compression; the resultant costs can increase undesirably due to an increase in length of time required for execution of the intended processing and also the necessity to employ an extra expansion device. A further problem faced with the prior art method is that detection accuracy stays lower. This can be said because the method tends to incorrectly detect the inherently non-abnormal objects—such as tree swing with regular vibration in movement direction, curtain movement, or else—as abnormal objects due to the fact that these exhibit changes in comparison with the background scene image thereof.

SUMMARY OF THE INVENTION

It is therefore a primary object of the present invention to provide an image monitoring apparatus capable of accurately detecting any available "true" abnormal objects with a low-cost arrangement at high speeds while avoiding a need to add any modifications and alterations to compressed images even in the environment in which tree swing with regular vibrations in movement or curtain movements are present in addition to environments with a luminance variation with time such as brightness changes due to fluorescent lamp flickers or repeated turn-on/off of luminance devices and also daylight changes of the sunlight and clouds or else.

To attain the foregoing object, the present invention provides an image monitoring method which comprises the steps of subdividing an image as input from an image capturing device into blocks, comparing image data of a frame to be processed with image data of its immediately preceding frame in units of the blocks to thereby extract more than one abnormal object candidate in accordance with edge presence/absence and longitudinal/lateral edge ratio change rates, and determining whether the abnormal object candidate is an abnormal object, wherein the step of determining includes a sub-step of judging the abnormal object candidate as an abnormal object in case this candidate is kept traceable for a prespecified length of time period. In addition, with the present invention, there is also provided a computer-readable storage medium which is characterized by holding therein a computer program for realization of the image monitoring method of this invention.

Furthermore, the instant invention provides an image monitoring apparatus which employs the image monitoring method of the invention. More specifically, with the present invention, an image monitoring apparatus is provided which comprises means for subdividing an image as input from an image capturing device into blocks, an object candidate extraction unit operable to compare image data of a frame to be processed with image data of its immediately preceding frame in units of the blocks to thereby extract more than one abnormal object candidate in accordance with edge presence/absence and longitudinal-to-lateral edge ratio change rates, and an object judging unit for determination of whether the abnormal object candidate is truly an abnormal object or not, wherein the object judging unit is operable to determine the abnormal object candidate as an abnormal object in case this candidate is kept traceable for a prespecified length of time period.

It should be noted that the object candidate extraction unit is capable of extracting the above-noted abnormal object candidate on the basis of a change with time of more than one frequency component that has been acquired through execution of orthogonal conversion or transformation of block data. Note here that the orthogonal transformation may include discrete cosine transform and/or orthogonal wavelet transform.

It must also be noted that the image monitoring apparatus of the present invention is desirably arranged so that it further has a tracking data calculation unit for tracking of an abnormal object as detected by the object judging unit, and an image capture device controller for generating and outputting based on the tracking data an image capture device-use control signal for changing an angle of an optical axis of the image capturing device. With such an arrangement, it is possible to automatically capture or "photograph" a scene in which the detected abnormal object is being tracked.

Additionally it is preferable that the tracking data at least include the movement amount of any detected abnormal object in at least either one of the horizontal direction and vertical direction. It is also desirable that the control signal adaptable for use with the image capture/photographing device include a control signal in accordance with the change amount of an optical axis angle of the image capture device as has been converted through computation from the movement amount of this abnormal object.

Further note that the image monitoring apparatus of this invention is preferably arranged to have an additive data creation unit for creation of display-use information as to the abnormal object thus detected. With such an arrangement, letting additive data along with the detected abnormal object makes it possible for a surveillance or "watchdog" person to readily recognize the information as to such abnormal object.

Also preferably the image monitoring apparatus of the invention further comprises an input device, a communication device, and a communication control unit operatively responsive to receipt of an instruction as input through the input device for performing communication with respect to at least one of predefined communication destinations via the communication device. With such an arrangement, it is possible for the surveillance person or watchman who has recognized the presence of any abnormal object to promptly contact appropriate "in-situ" associates or workers who are expected to cope with accidents and problems at the location or site whereat the abnormality presently occurs.

BRIEF DESCRIPTION OF THE DRAWINGS

[FIG. 7] A function block diagram showing another example of the block data calculator unit of the embodiment 1.

[FIG. 8] A function block diagram showing an image conversion or transformation device of the embodiment 2.

DETAILED DESCRIPTION OF THE INVENTION

Figure 1:
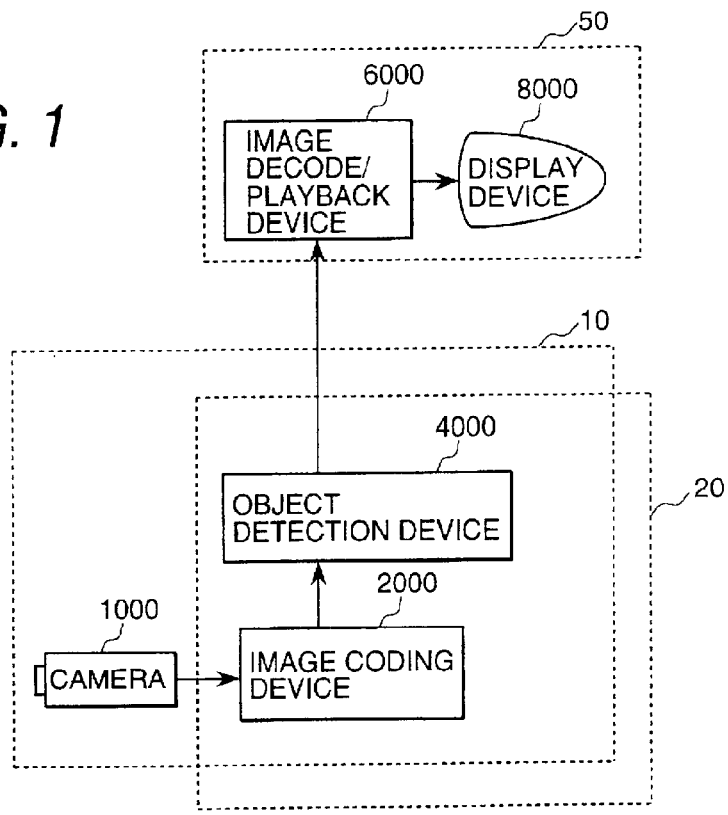
[FIG. 1] A functional block diagram showing an image monitoring apparatus in accordance with an embodiment 1.

In the image monitoring/surveillance apparatus which incorporates the principles of the invention as disclosed and claimed herein, the block data calculation means is operable to calculate through computation the required block data for use as a minimal unit of compression and coding processing of the image coding device which is for compressing and coding an image being input from a camera, by way of example. The block data may be a frequency component with orthogonal transformation applied thereto, wherein with regard to this frequency component, the object candidate extraction means calculates a longitude-to-lateral edge ratio by use of luminance information of such frequency component to thereby extract any available change with time in longitudinal/lateral edge ratio through comparison and judgment processes.

The object determining or "judging" means is operable to perform correlation processing of present-time data and its previous time data between the same blocks corresponding to coded data of said image coding device and/or between image signals as reproduced or played back by said image decoding/playback device with respect to certain blocks as extracted by said object extraction means and/or the blocks also containing peripheries to thereby make a decision as an abnormal object in the case of being less than or equal to a threshold value.

Optionally the image monitoring apparatus of this invention is modifiable in a way such that an image conversion or transformation device is used to subdivide an image being input from a camera into a plurality of blocks whereas, with respect to more than one frequency component as has been acquired through execution of orthogonal transformation of each block data, the object candidate extraction means uses the frequency component's luminance information to calculate a longitudinal/lateral edge ratio for extraction of a change in longitudinal/lateral edge ratio due to time elapse through comparison and judgment processes.

In this case the object judging means performs correlation processing of a present time data and its previous time data between the same blocks with respect to a block(s) as extracted at said object candidate extraction means and/or the block(s) also including peripheries and relative to the resultant orthogonal transformation-applied frequency component in units of camera input images and/or blocks and then makes a decision as an abnormal object in the case of being less than or equal to the threshold value.

Alternatively the image monitoring apparatus of this invention may be arranged to employ as the image capture device a device which has a camera and its associated mount base equipment, also known as the camera platform, which is capable of changing the optical axis angle of such camera. In this case, it is the block data calculation means that successively calculates block data of the compression/coding minimum unit of the image coding device which executes compression and coding processing, with respect to video images being sequentially input from the camera of this image capture device. The block data may be a frequency component with orthogonal transformation applied thereto, wherein with regard to this frequency component, the object candidate extraction means calculates a longitude-to-lateral edge ratio by use of luminance information of such frequency component to thereby extract any available change with time in longitudinal/lateral edge ratio through comparison and judgment processes.

The object judging means is characterized in that with respect to certain blocks as extracted by said object candidate extraction means and/or the blocks also including peripheries, it performs correlation processing of present time data and its previous time data between the same blocks corresponding to the coded data of said image coding device and/or between the image signals as reproduced by said image decode/playback device and then makes a decision as an abnormal object in the case of being less than or equal to the threshold value while comprising tracking data calculation means for calculating, upon detection of such abnormal object at the object judging means, a horizontal direction movement amount and/or vertical direction movement amount of the abnormal object for the purpose of tracking the abnormal object and also comprising camera control means for converting the horizontal direction movement amount as calculated by the tracking data calculation means into a horizontal direction movement amount of the camera while converting the vertical direction movement amount into a vertical direction movement amount of the camera to thereby send forth camera movement control information toward the camera with its mount base or "platform" added thereto.

Additionally the image monitoring apparatus of this invention may be designed to have additive data creation means. In this case also, with respect to any image being input from the camera, the block data calculation means calculates or computes block data of the compression/coding minimum unit of the image coding device which is for execution of compression and coding processing. The block data may be a frequency component with orthogonal transformation applied thereto, wherein with regard to this frequency component, the object candidate extraction means calculates a longitude-to-lateral edge ratio by use of luminance information of such frequency component to thereby extract any available change with time in longitudinal/lateral edge ratio through comparison and judgment processes. The object judging means is characterized in that with respect to certain blocks as extracted by said object candidate extraction means and/or the blocks also including peripheries, it performs correlation processing of present time data and its previous time data between the same blocks corresponding to the coded data of said image coding device and/or between the image signals as reproduced by said image decode/playback device and then makes a decision as an abnormal object in the case of being less than or equal to the threshold value, wherein in the event that any abnormal object is detected by the object judging means, the additive data creation means creates and prepares additive information corresponding to the abnormal object while permitting an additive information storage means to store therein the resultant data as has been created at the additive information creation means. In the case of playback of coded data of the image coding device, it comprises display data selection means for performing selection for visual display of data being presently stored in the additive information storage means in a way corresponding to a specified video image.

Also note that the image monitoring apparatus of the invention may also comprise an interface capable of transmitting the abnormality toward a troubleshooting person who is responsible to deal with system troubles and accidents. In this case also, with respect to any image being input from the camera, the block data calculation means calculates or computes block data of the compression/coding minimum unit of the image coding device which is for execution of compression and coding processing. The block data may be a frequency component with orthogonal transformation applied thereto, wherein with regard to this frequency component, the object candidate extraction means calculates a longitude-to-lateral edge ratio by use of luminance information of such frequency component to thereby extract any available change with time in longitudinal/lateral edge ratio through comparison and judgment processes. The object judging means is characterized in that with respect to certain blocks as extracted by said object candidate extraction means and/or the blocks also including peripheries, it performs correlation processing of present time data and its previous time data between the same blocks corresponding to the coded data of said image coding device and/or between the image signals as reproduced by said image decode/playback device and then makes a decision as an abnormal object in the case of being less than or equal to the threshold value. In the event that any abnormal object is detected by the object judging means, the image decode/playback means reproduces coded data of said image coding device while comprising an interface which visually displays at a display device the image as reproduced by the image decode/playback means and, when the watch person has decided the object to be an abnormality, transmits the abnormality by issuance of an instruction of a specified location or position on the display device screen toward an appropriate troubleshooter who has jurisdiction over the area under surveillance.

An explanation will now be given of several preferred embodiments of the present invention with reference to the accompanying drawings below.

[EMBODIMENT 1]

A. Apparatus Arrangement (1) Overall Arrangement

As shown in FIG. 1, an image monitoring/surveillance apparatus embodying the invention includes a processing apparatus main body 10 and a decode-playback/display device 50. Note here that although in the illustrative embodiment the processing apparatus main body 10 contains a camera 1000 therein, the image monitoring apparatus may alternatively be constituted from a processing apparatus main body 20 and camera 1000 plus decode-playback/display device 50 with the camera 1000 being excluded from the processing apparatus main body 20.

The processing apparatus main body 10 of this embodiment comprises the camera 1000 for capturing or "photographing" the scene of interest under surveillance, an image coding device 2000 for compression and coding of a video image or images as input from the camera 1000, and an object detection device 4000 for detection of any abnormal objects. The decode-playback/display device 50 includes an image display device 8000 for visually displaying images and an image decoding/playback device 6000 which is operable to decode the coded data of image coding device 2000 for display at the display device 8000.

Here, the camera 1000, image coding device 2000, image decoding/playback device 6000 and display device 8000 may be arranged to employ currently available standard devices with known designs. Also note that although in this embodiment the camera 1000 and the image coding device 2000 are designed as separate devices, a device with these components integrated together may alternatively be employable—that is, the arrangement for image pickup/capturing and coding processing should not in particular be limited to the illustrated one as far as there is obtainable an output of data with a captured image being compressed and coded.

Figure 3:
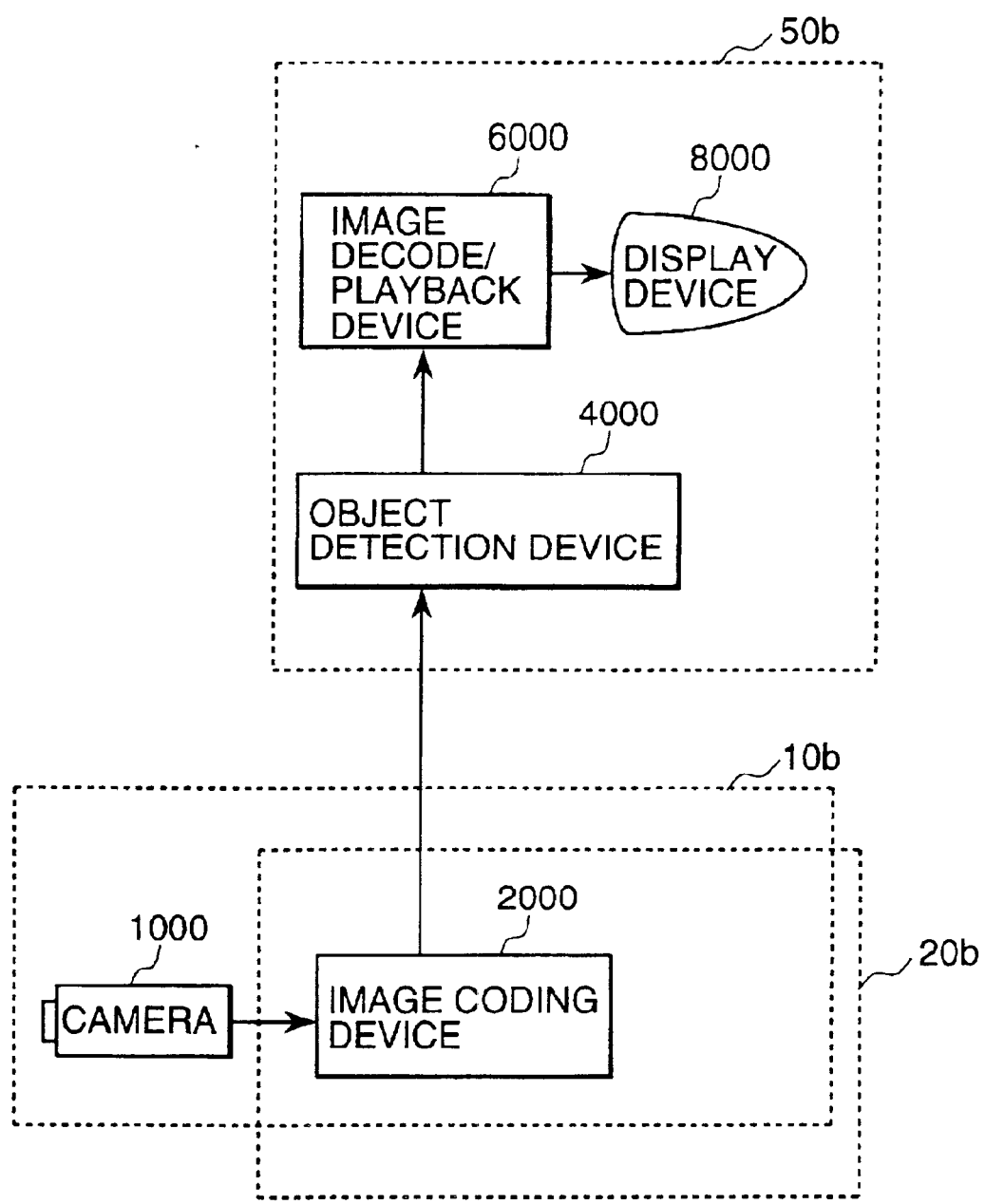
[FIG. 3] A function block diagram showing another example of the image monitoring apparatus of the embodiment 1.

It should be noted that although in the image monitoring apparatus of this embodiment the object detection device 4000 is provided within the processing apparatus main body 10, the object detection device 4000 may alternatively be provided in a decode-playback/display device 50b rather than in a processing apparatus main body 10b or 20b as shown in FIG. 3.

It is also noted that a relationship in position of the camera 1000, image coding device 2000, object detection device 4000, image decode/playback device 6000, image display device 8000 and the like should not exclusively be limited to the one shown herein and may be arranged so that any one of them is at a remote location. Irrespective of whether communication lines used for data transmission among them are of wired links or wireless or "over-the-air" links, any given means is employable therefor. In cases where the camera 1000 or image display device 8000 or else is at a remote site, communication with such a distant component is achievable by use of currently established standard communication links including, but not limited to, public telephone lines, local area networks (LANs), wide area networks (WANS) and so forth, although online communication schemes based on the Internet using the World Wide Web (WWW) architectures may also be used when the need arises.

(2) Image Coding Device

Figure 4:
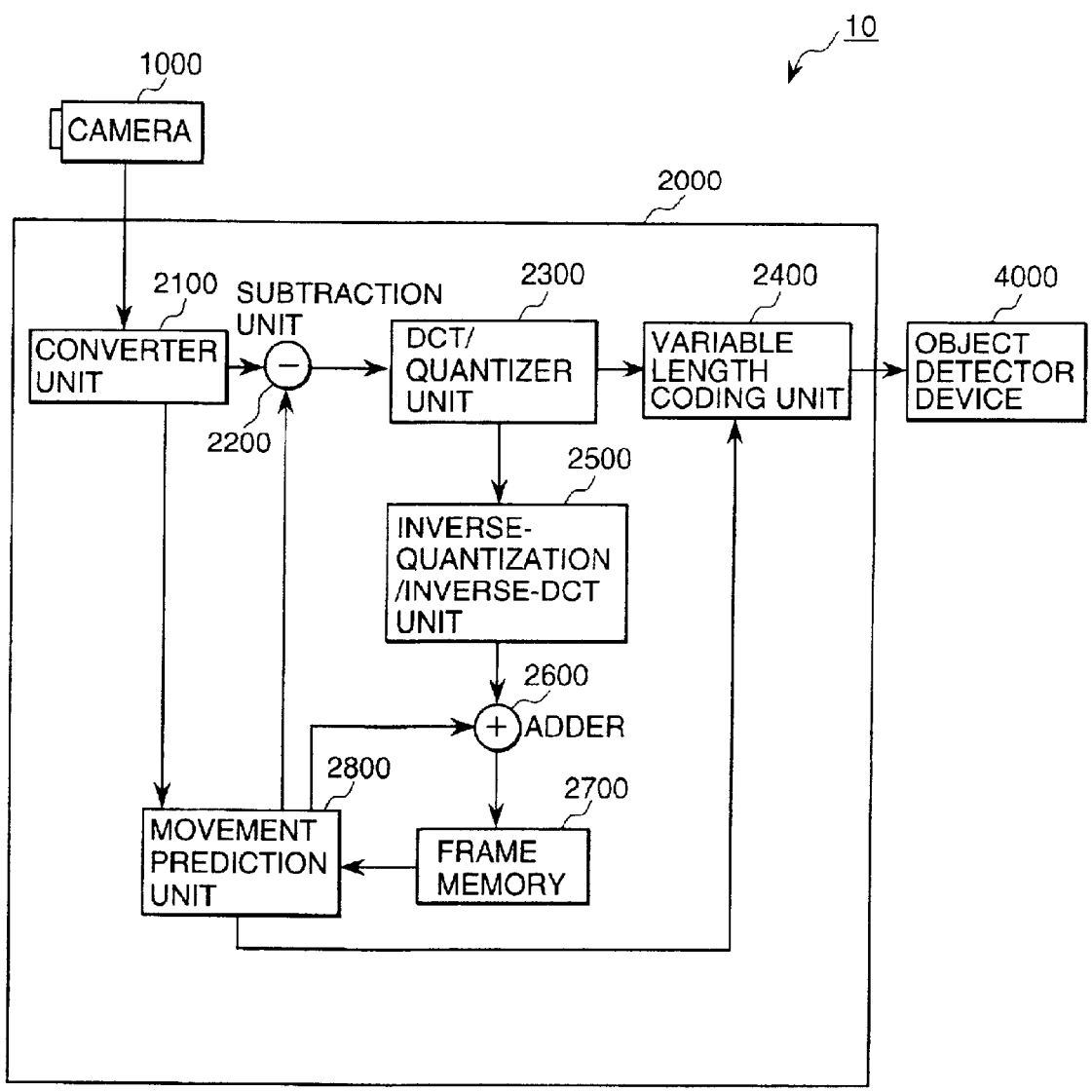
[FIG. 4] A function block diagram showing an image coding device of the embodiment 1.

As shown in FIG. 4, the image coding device 2000 of this embodiment is arranged including a conversion/transform unit 2100, a subtraction unit 2200, a DCT/quantization unit 2300, a length-variable coding unit 2400, an inverse-quantization/inverse-DCT unit 2500, an adder 2600, a frame memory 2700, and a movement prediction unit 2800.

The converter unit 2100 is operable to separate part of a video signal being input from the camera 1000 which corresponds to a single frame into a brightness or luminance signal and its associative two color difference signals (blue difference signal and red difference signal) and then perform subdivision into units of macro blocks (referred to as "MBs" hereinafter) for output toward the subtracter 2200 and movement prediction unit 2800. A single MB consists essentially of six blocks, which are made up from luminance blocks formed of 16-pixel by 16-line luminance signals (i.e. an ensemble of four blocks each consisting of 8-pixel/8-line luminance signals), a blue color difference block formed of 8-pixel/8-line blue color difference signals, and a red color difference block formed of 8-pixel/8-line red color difference signals. Note here that the blue color difference signal and red color difference signal have been subjected to ½ sampling both in the horizontal direction and in the vertical direction. Here, assume that an "n" frame is a present frame while letting a past or future frame adjacent to the n frame be an "m" frame—this will be used as a reference frame.

The movement prediction unit 2800 performs, with respect to n-frame pixels "p" in units of luminance blocks, an operation for searching in units of 0.5 pixels specific pixels p* similar to the pixels p from an interpolated image which has been created by use of neighboring pixels within the m frame. Here, let a luminance block that is minimal in total sum of absolute value differences of luminance differences on a per-pixel basis be a maximal similarity block YBs while calling as reference blocks three blocks including a blue color difference block CbBs and a red color difference block CrBs which spatially correspond to YBs.

The subtraction unit 2200 calculates a prediction error as represented by a difference between an MB as input from the conversion unit 2100 and the MB's reference block(s) and then outputs it toward the DCT/quantization unit 2300. This DCT/quantization unit 2300 uses information as divided in units of blocks of 8 pixels×8 lines to perform discrete cosine transformation (DCT) that is orthogonal transform of the luminance data and then performs quantization of its resultant DCT coefficient thus obtained to thereby output it to the length-variable coding unit 2400 and inverse-quantization/inverse-DCT unit 2500. The DCT transform as used herein is shown in the following formula (Equation 1).

Equation 1

$$F(u, v) = \frac{2}{\sqrt{M}\sqrt{N}} \cdot C(u)(v) \sum_{j=0}^{M-1} \sum_{k=0}^{N-1} f(j, k) \times \cos\left\{\frac{(2j+1)\mu\pi}{2M}\right\} \cos\left\{\frac{(2k+1)\mu\pi}{2N}\right\} \quad (1)$$

here, $$C(u), C(v) = \frac{1}{\sqrt{2}} \quad \text{when } u = 0 \text{ or } v = 0$$
$$= 1 \quad \text{when } u \neq 0 \text{ or } v \neq 0$$

The inverse-quantization/inverse-DCT unit 2500 applies both inverse quantization and inverse DCT processing to the data as quantized by the DCT/quantization unit 2300, decodes a prediction error(s), performs addition of the decoded data and the reference blocks at the adder 2600 for reproduction or "playback" of a frame being presently subject to coding processing, and then stores a result in the frame memory 2700 on a per-block basis. Its immediately preceding frame that was played back through a similar procedure is also being stored in the frame memory 2700.

Furthermore, the movement prediction unit 2800 calculates a movement vector in the present frame from the reference block YBs of the reference frame and also from more than one luminance block of the present frame. The movement vector is indicative of a spatial relationship in position between the present frame's luminance block and the reference block YBs, which may be represented by a horizontal component and a vertical component. The movement prediction unit 2800 outputs the resulting YBs, CbBs and CrBs thus calculated in the way stated above toward the subtraction unit 2200 and further outputs the movement vector to the length-variable coding unit 2400.

The length-variable coding unit 2400 executes length-variable coding processing with respect to both the quantized data as created at the DCT/quantization unit 2300 and the movement vector as obtained from the movement prediction unit 2800 and others and then performs a data output operation. Note here that any available devices with standard or ordinary arrangements for video signal encoding are employable as the image coding device 2000.

(3) Object Detection Device

Figure 5:
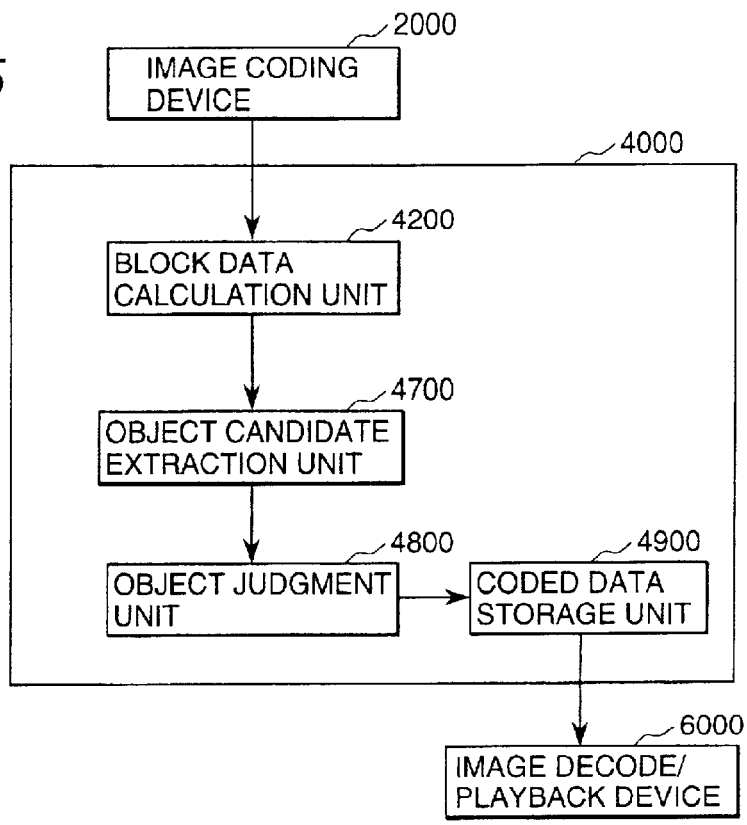
[FIG. 5] A function block diagram showing an object detection device of the embodiment 1.

As shown in FIG. 5, the object detection device 4000 of the illustrative embodiment is arranged to include a block data calculation unit 4200, object candidate extraction unit 4700, object judging unit 4800, and coded data storage unit 4900. In this embodiment the object detection device 4000 may be realized by an information processing device with a central arithmetic processor device and a main storage device plus an external storage device. Additionally the use of the external storage device may be eliminated where unnecessary, such as in cases where programs are to be read out of the outside via communication lines or links.

The coded data storage unit 4900 is a storage region as secured in either the main storage device or the external storage device. The block data calculation unit 4200, object candidate extraction unit 4700 and object judging unit 4800 are realizable in a way such that the central arithmetic processor device is designed to execute a program as loaded into the main storage device from storage media (such as optical discs, magneto-optical disks, magnetic disks or the like) via the external storage device or else. Although in this embodiment a respective part of the object detection device 4000 is realized by a software, the present invention should not exclusively be limited thereto and may be modifiable in a way such that the object detection device 4000 is realized by use of a special-purpose or "dedicated" device (chip) including hard wired logic circuitry.

The block data calculation unit 4200 takes out or extracts block data as a result of the DCT as has been performed by the DCT/quantization unit 2300 and then calculates an edge ratio relative to the block data thus taken out. The object candidate extraction unit 4700 utilizes the edge ratio thus calculated to compare a present frame with its proceeding or previous frame to thereby extract a case of a change being greater than or equal to a prespecified level as a candidate of abnormal object. The object judging unit 4800 performs object judgment based on a change state or the like of a region that was determined as a candidate at the object candidate extraction unit 4700; in the case of judgment as an object, it stores coded data of this frame with compression and coding processing applied thereto into the coded data storage unit 4900.

Figure 6:
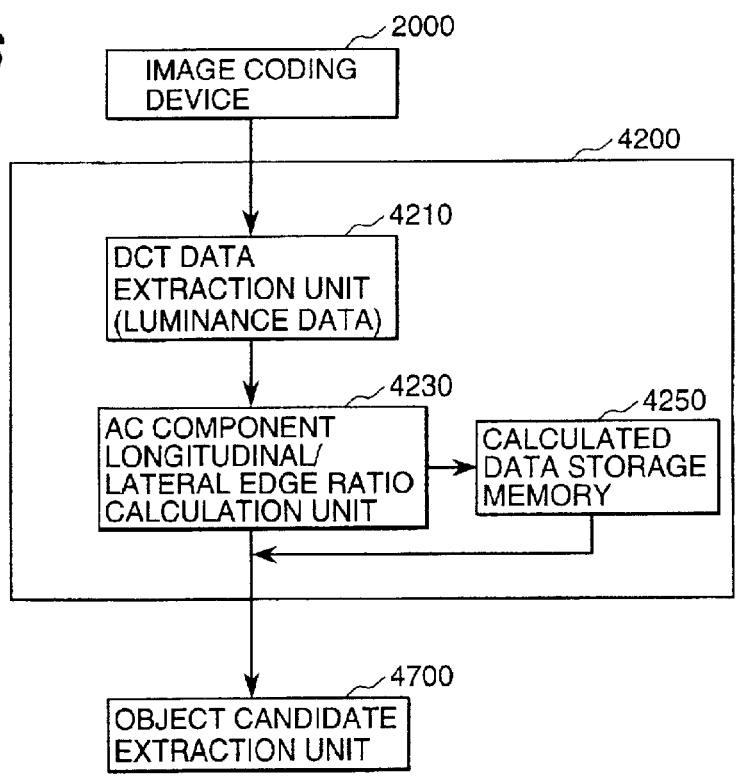
[FIG. 6] A function block diagram showing a block data calculation unit of the embodiment 1.

As shown in FIG. 6, the block data calculation unit 4200 comprises a DCT data extraction unit 4210, AC component longitudinal-to-lateral edge ratio calculation unit 4230, and calculated data storage memory 4250.

The DCT data extraction unit 4210 takes out of the DCT coefficient—this is a result of the DCT in units of 8-pixel/8-line blocks as has been executed at the DCT/quantization unit 2300—block data of a luminance block consisting of 8-pixel/8-line luminance signals. The AC component longitudinal/lateral edge ratio calculation unit 4230 makes use of an AC component which is a high-frequency component of the DCT coefficient as has been calculated by the DCT data extraction unit 4210 to calculate an edge value in the horizontal direction and an edge value in the vertical direction and, thereafter, calculates a longitudinal/lateral edge ratio and then stores the ratio thus calculated into the calculated data storage memory 4250. The calculated data storage memory 4250 is a storage region for retaining therein the longitudinal/lateral edge ratio thus calculated.

It should be noted that a DC component calculation unit 4270 may further be provided in the block data calculation unit 4200 as shown in FIG. 7. The block data calculation unit 4200 takes out of the DCT coefficient as has been calculated by the DCT data extraction unit 4210 a DC component that is a low-frequency component. The values that have been calculated by the DC component calculation unit 4270 and the AC component longitudinal/lateral edge ratio calculation unit 4230 are then stored in a calculated data storage memory 4260. In the case of using such scheme, the object candidate extraction unit 4700 extracts one or more abnormal object candidates by use of the values as calculated by these AC component longitudinal/lateral edge ratio calculation unit 4230 and DC component calculation unit 4270 and then stored in the calculated data storage memory 4260.

(4) Image Decoding/Playback Device

Figure 20:
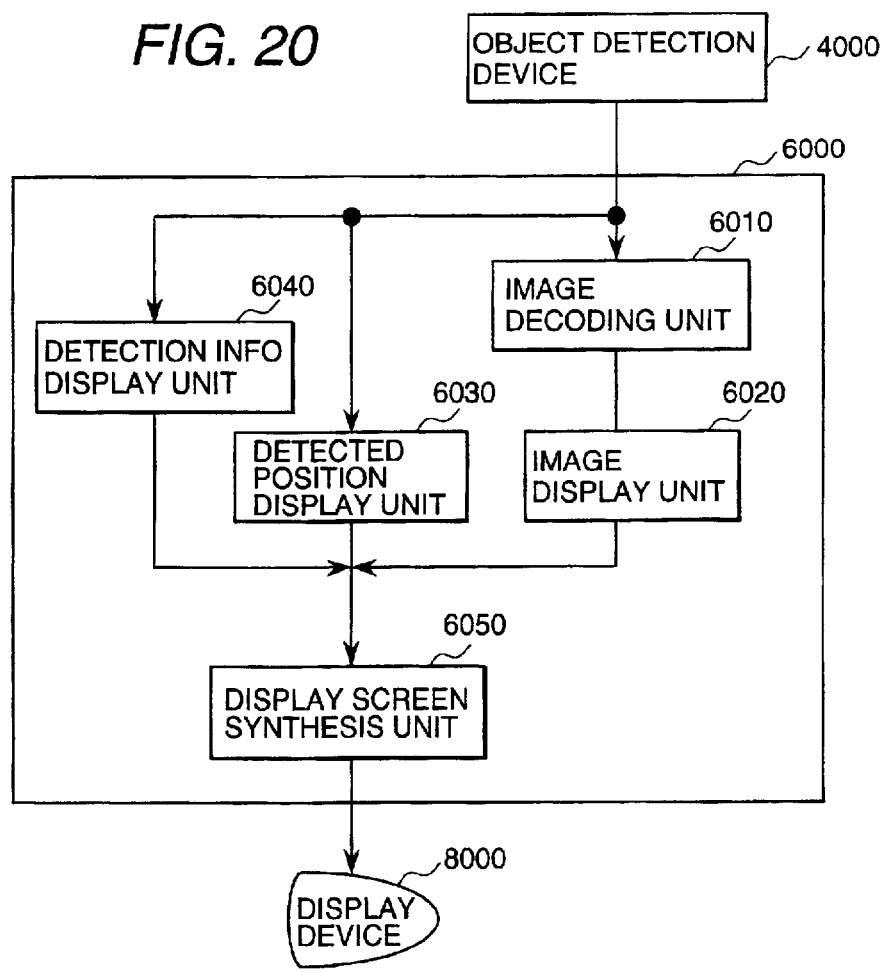
[FIG. 20] A function block diagram showing an image decoding/playback device of the embodiment 1.

As shown in FIG. 20, the image decoding/playback device 6000 of this embodiment comprises an image decoding unit 6010, image display unit 6020, detected position display unit 6030, detection information display unit 6040, and display screen synthesis unit 6050.

The image decoding unit 6010 may be designed to employ standard or ordinary configurations for enabling reproduction or playback of an image signal(s), which unit is arranged to perform data decoding processing through execution of a procedure reverse to that of the coding processing of the image coding device 2000. The detection information display unit 6040 creates display data of additive or "appendix" information or the like of the abnormal object including but not limited to the name of a scene in which the abnormal object (object that is moving abnormally) as detected by the object detection device 4000 has been photographed and time/date or else whereas the detected position display unit 6030 prepares clearly indicative display data of an abnormal object position as has been detected at the object detection device 4000. The image display unit 6020 visually displays an image signal as reproduced at the image decoding unit 6010. The display screen synthesis unit 6050 performs, with respect to a reproduced image of the image display unit 6020, pasting and/or synthesis of the display data of the detection information display unit 6040 and the detected position display unit 6030 to thereby produce display data for enabling a monitoring or "watchdog" person to visually judge and recognize any abnormal object information at a glance, and then displays it on the display screen of the display device 8000.

B. Arrangement of Coded Data

Figure 12:
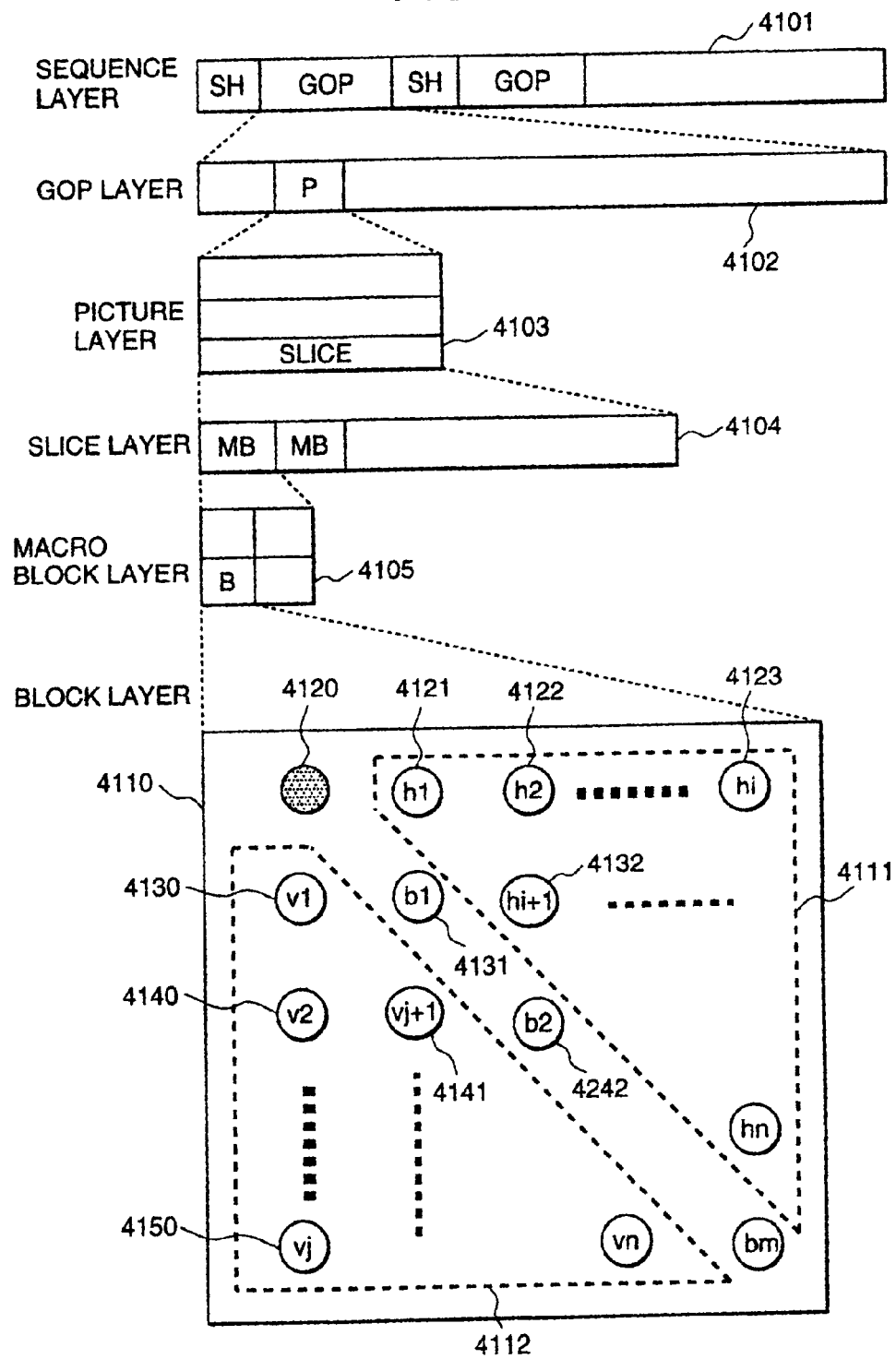
[FIG. 12] An explanation diagram showing an arrangement of coded data in the embodiment 1.

As shown in FIG. 12, the coded data of the image coding device 2000 in this embodiment is arranged to have a hierarchical structure in a manner such that a layer at the uppermost level is used as a sequence layer 4101 with its associated layers as a GOP layer 4102, picture layer 4103, slice layer 4104, macro block layer 4105, and block layer 4110 in the order of sequence toward the lower level thereof. The sequence layer 4101 that is the uppermost level layer includes a sequence header (SH) and a group of pictures (GOP). A standard one is employable as the data structure of such coded data.

The DCT coefficient which is a result of the DCT processing in units of 8-pixel/8-line blocks as has been executed at the DCT/quantization unit 2300 is held at the block layer 4110. An initial pixel 4120 of the DCT coefficient is a DC component whereas the remaining sixty three pixels, i.e. $h_1$ pixel 4121, $h_2$ pixel 4122, ..., $h_i$ pixel 4123, $v_1$ pixel 4130, $b_1$ pixel 4131, $h_{i+1}$ pixel 4132, ..., $V_2$ pixel 4140, $v_{j+1}$ pixel 4141, $b_2$ pixel 4142, ..., $v_j$ pixel 4150, ..., are AC components. A value that the DC component calculation unit 4270 uses for calculation is a "native" value of the initial pixel 4120 of the DCT coefficient with no modifications added thereto. Values the AC component longitudinal/lateral edge ratio calculation unit 4230 uses for calculation are such that a pixel group 4111 of the upper right half part of a block, i.e. $h_1$ pixel 4121, $h_2$ pixel 4122, ..., $h_i$ pixel 4123, ..., $h_{i+1}$ pixel 4132, ..., is used for horizontal edge calculation whereas a pixel group 4112 of the lower left half part of the block, i.e. $v_1$ pixel 4130, $v_2$ pixel 4140, $v_{j+1}$ pixel 4141, ..., $v_j$ pixel 4150, ..., is used for vertical edge calculation.

C. Flow of Processing

The image monitoring apparatus of this embodiment is such that the image decoding/playback device 6000 visually displays at the image display device 8000 any object or objects that have been detected by the object detection device 4000 on the basis of the image data as coded by the image coding device 2000. Standard techniques may be used execute the image coding and decoding processing required. In view of this, an explanation mainly about a flow of processing at the object detection device 4000 will be given here.

At the object detection device 4000, the DCT data extraction unit 4210 extracts block data; the AC component longitudinal/lateral edge ratio calculation unit 4230 calculates a longitudinal/lateral edge ratio with respect to this block data; the object candidate extraction unit 4700 uses this to extract any available abnormal object candidate; the object judging unit 4800 determines or "judges" whether this candidate is truly an object or not and then stores coded data of a frame that was judged to be an object in the coded data storage unit 4900.

(1) AC Component Longitudinal/Lateral Edge Ratio Calculation Unit

Figure 13:
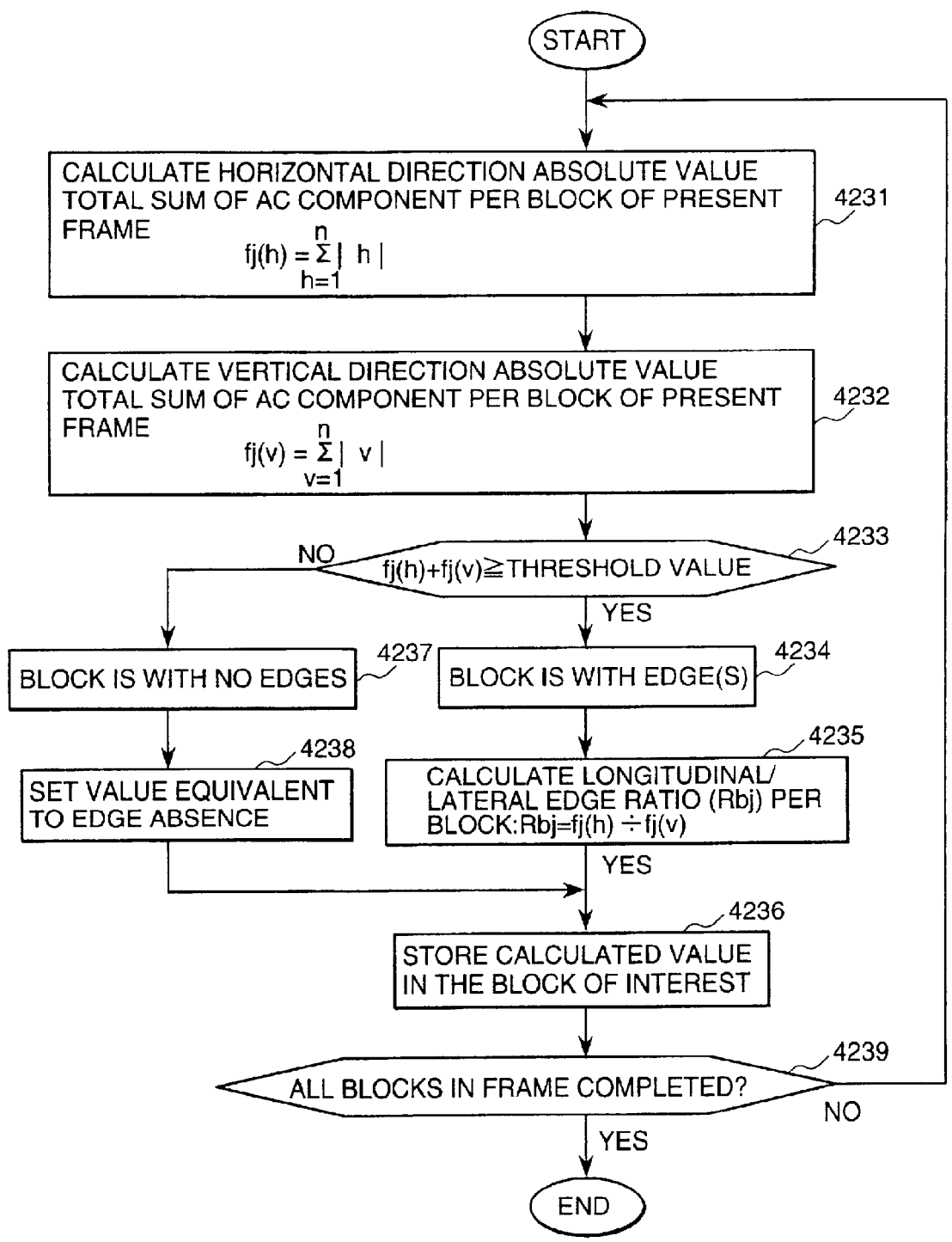
[FIG. 13] A flow diagram showing a processing procedure of an AC component longitude-to-lateral edge ratio calculation unit of the embodiment 1.

A flow of processing at the AC component longitudinal/lateral edge ratio calculation unit 4230 of this embodiment is shown in FIG. 13. Firstly the AC component longitudinal/lateral edge ratio calculation unit 4230 calculates a horizontal direction absolute value total sum of the pixel group 4111 at the upper right half part of AC components in the block layer 4110 of a presently input image (present frame) on a per-block basis and then lets it be fj(h) (at step 4231). Then, the AC component longitudinal/lateral edge ratio calculation unit 4230 calculates a vertical direction absolute value total sum of the pixel group 4112 at the lower left part of AC components in the block layer 4110 of the presently input image (present image) on a per-block basis and then lets it be fj(v) (step 4232).

Here, fj(h) may alternatively be an addition of any given combinations of absolute values as selected from the pixel group 4111 of the upper right half part, rather than the above-noted horizontal direction absolute value total sum. Similarly fj(v) should not exclusively be the vertical direction absolute value total sum and may alternatively be an addition of those combinations as selected from the pixel group 4112 at the lower left half part while letting them have the same regularity as that of any given combinations of the absolute values as selected from the pixel group 4111 of the upper right half part. Note that the addition of combinations with the same regularity is to be understood to mean that if fj(h) is the one with the absolute value of $h_1$ pixel 4121 and the absolute value of $h_2$ pixel 4122 added together by way of example then fj(v) is also the one with the absolute value of $v_1$ pixel 4130 and the absolute value of $v_2$ pixel 4140 added together.

Subsequently the AC component longitudinal/lateral edge ratio calculation unit 4230 checks to determine whether an addition value of the fj(h) as has been calculated at the step 4231 and fj(v) calculated at step 4232 is greater than or equal to a threshold value (at step 4233). In the event that it is kept less than the threshold value at the judgment of step 4233, this means that no edges are present in the block at step 4237, that is, a block image is in a uniform state; thus, the AC component longitudinal/lateral edge ratio calculation unit 4230 sets a value equivalent to the edge absence (step 4238). Alternatively in case it is judged to be greater than or equal to the threshold value at step 4233, it means that more than one edge must be present at the block of interest; thus, the AC component longitudinal/lateral edge ratio calculation unit 4230 calculates at step 4235 a value of fj(h)/fj(v) of the block as a longitudinal/lateral edge ratio ($Rb_j$) (step 4234) and then stores the calculated value in the block per se (step 4236). Note here that the longitudinal/lateral edge ratio ($Rb_j$) may be such that the ratio is kept calculable; for example, it may alternatively be fj(v)/fj(h).

Lastly the AC component longitudinal/lateral edge ratio calculation unit 4230 judges whether all the blocks available within the present frame are completed in or not (at step 4239): if not completed, then let the processing return to step 4231.

Figure 16:
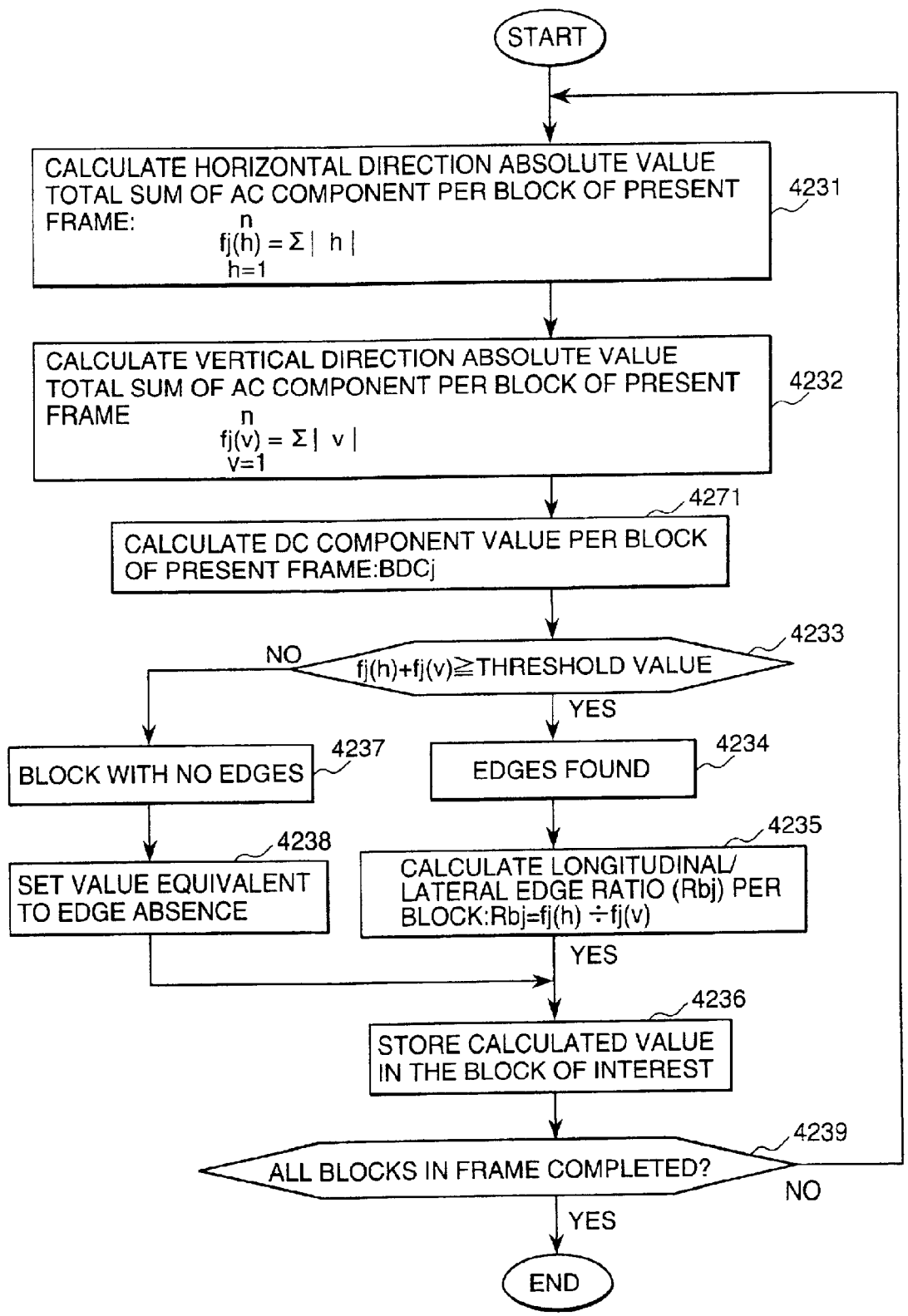
[FIG. 16] A flow diagram showing processing procedures of the AC component longitudinal/lateral edge ratio calculation unit and DC component calculation unit in the event that a DC component value or values are used in the embodiment 1.

It should be noted that in case the DC component calculation unit 4270 is provided in the block data calculation unit 4200 as shown in FIG. 7, add specific processing (step 4271) for calculation of the value ($BDC_j$) of a DC component that is a low-frequency component in units of blocks of the present frame, which processing is to be done by the DC component calculation unit 4270. Also note that although in FIG. 16 the processing of this step 4271 is inserted between the step 4232 to be done by the AC component longitudinal/lateral edge ratio calculation unit 4230 and the processing at step 4233, the present invention should not be limited only thereto and may be modifiable in any way as far as this processing is performed with respect to all the blocks prior to execution of the processing at the object candidate extraction unit 4700.

(2) Object Candidate Extraction Unit

Figure 14:
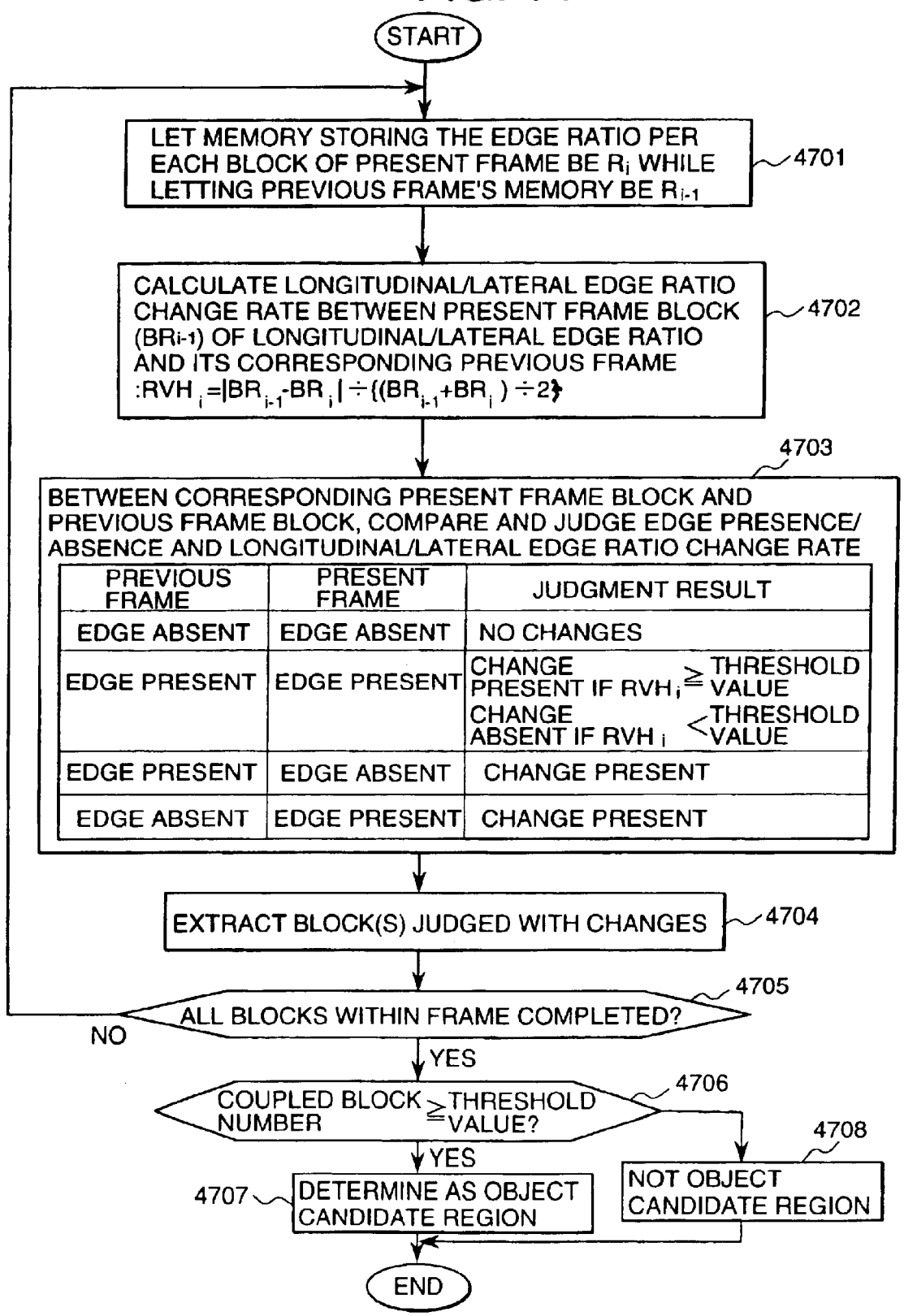
[FIG. 14] A flow diagram showing a processing procedure of an object candidate extraction unit of the embodiment 1.

A flow of processing of the object candidate extraction unit 4700 in this embodiment is shown in FIG. 14. First, the object candidate extraction unit 4700 lets a memory storing therein the edge ratio per block of the present frame be $R_i$ while letting a memory of its previous frame be $R_{i-1}$ (at step 4701). Here, the previous frame may alternatively be an immediately preceding frame or a reference frame or the like.

Subsequently the object candidate extraction unit 4700 calculates a longitudinal/lateral ratio change rate ($RVH_i$) between a present frame block ($BR_i$) of the longitudinal/lateral edge ratio and a previous frame block ($BR_{i-1}$) that corresponds thereto (at step 4702). For instance, let the longitudinal/lateral ratio change rate ($RVH_i$) be given as:

$$RVH_i = |BR_{i-1} - BR_i| \div \{(BR_{i-1} + BR_i) \div 2\}$$

Alternatively let it be:

$$RVH_i = |BR_{i-1} 31\ BR_i|$$

Still alternatively let it be:

$$RVH_i = |BR_{i-1} - BR_i| \div BR_i$$

Next, between a corresponding present frame block and its previous frame block, the object candidate extraction unit 4700 judges through comparison whether any edge is present or absent and also the longitudinal/lateral ratio change rate (step 4703). The comparison/judgment process is done by a method including the steps of i) judging as "change absence" in case both the previous frame block and the present frame block are of edge absence, ii) in the event that more than one edge is present both in the previous frame block and in the present frame block, setting "change presence" if the longitudinal/lateral ratio change rate ($RVH_i$) is greater than or equal to a threshold value while setting "change absence" if the longitudinal/lateral ratio change rate ($RVH_i$) is less than the threshold value, iii) setting "change presence" in case the previous frame block is of edge presence whereas the present frame block is of edge absence, and iv) setting "change presence" in case the previous frame block is of edge absence whereas the present frame block is of edge presence.

Subsequently the object candidate extraction unit 4700 extracts more than one block as judged to be of the change presence (step 4704) and then checks to determine whether all the blocks within the frame of interest have been finished (step 4705). In case incompleteness is judged at step 4705, the object candidate extraction unit 4700 lets the processing get back to step 4701; alternatively, if completion is judged then execute the step 4706.

At step 4706 the object candidate extraction unit 4700 checks a coupling number of the "change presence" blocks thus extracted. Here, the object candidate extraction unit 4700 operates in a way which follows: In case the coupling number is greater than or equal to a threshold value, it regards this block as a candidate region of abnormal object (step 4707); if the number is less than the threshold value then determine that the block is an isolated or "stand-alone" block and thus judge that it must be a noise and not the candidate region of any abnormal object (step 4708).

Figure 15:
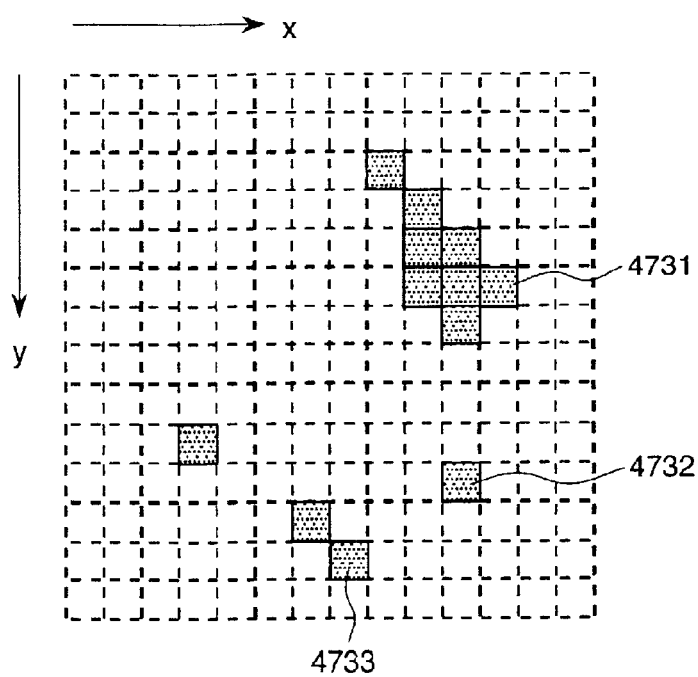
[FIG. 15] An explanation diagram showing blocks as extracted with the presence of step changes in the embodiment 1.

The blocks that have been extracted after the judgment of "change presence" at step 4704 are shown in FIG. 15. There are an isolated block 4732 and a coupled block 4731 in the extracted blocks. In light of this, at step 4706, the coupled block 4731 with its coupled number being greater than or equal to the threshold value (three blocks in this embodiment) is determined to be the candidate region of an abnormal region whereas regions 4732 and 4733 or the like each of which has less than three coupled blocks will be excluded as noises.

Figure 17:
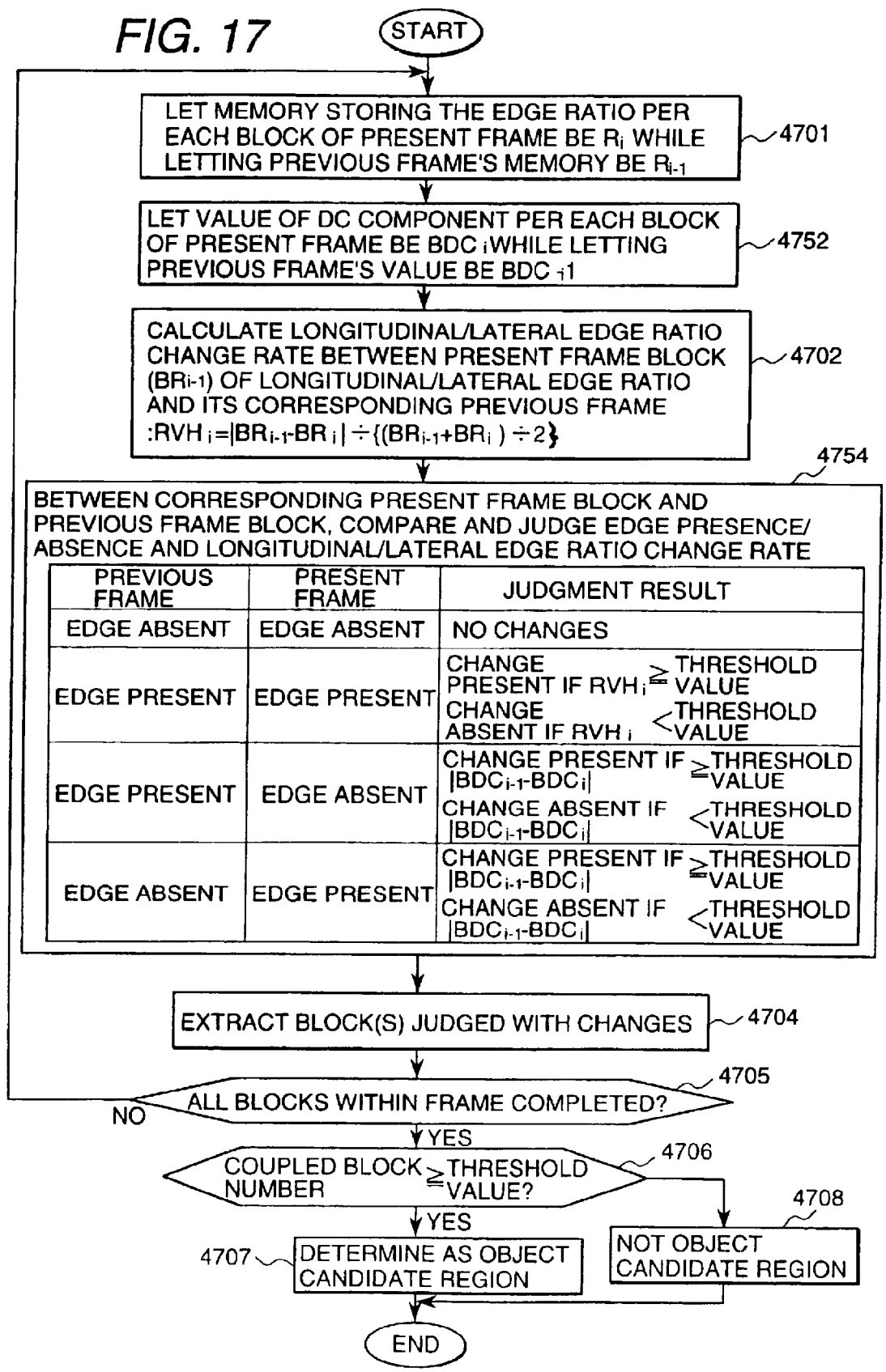
[FIG. 17] A flow diagram showing a processing procedure at the object candidate extraction unit in case a DC component value(s) is/are used in the embodiment 1.

It must be noted that in the case of provision of the DC component calculation unit 4270 in the block data calculation unit 4200 as shown in FIG. 7, the value BDCj of DC component per block is being held in the calculated data storage memory 4260 as a result of the processing at the above-stated step 4271. A flow of the processing at the object candidate extraction unit 4700 in this case is shown in FIG. 17.

In this case, the object candidate extraction unit 4700 performs, between the step 4701 and step 4702, processing for letting a DC component value per block of the present block be $BDC_i$ while letting a DC component value of its previous frame be $BDC_{i-1}$ (at step 4752). It this process also, the previous frame may alternatively be an immediately preceding frame or a reference frame or the like.

In addition, the object candidate extraction unit 4700 performs, in place of the step 4703, processing (step 4754) for judgment of change presence/absence by also using the DC component value in further addition to the edge presence/absence and the longitudinal/lateral ratio change rate.

At this step 4754 the object candidate extraction unit 4700 compares for judgment, between a corresponding present frame block and its previous frame block, whether any edge is present or absent along with the longitudinal/lateral ratio change rate thereof. The comparison/judgment process in this case is to be done by using a method having the steps of i) judging as "change absence" in case no edges are found in both the previous frame block and the present frame block, ii) in the event that edges are found in both the previous frame block and the present frame block, setting "change presence" if the longitudinal/lateral ratio change rate ($RVH_i$) is greater than or equal to a threshold value while setting "change absence" if the longitudinal/lateral ratio change rate ($RVH_i$) is less than the threshold value, iii) in the event that the previous frame block is of edge presence whereas the present frame block is of edge absence, setting "change presence" if the absolute value of a difference of DC component ($|BDC_{i-1} - BDC_i|$) is greater than or equal to a threshold value while alternatively setting "change absence" if it is less than the threshold value, iv) in case the previous frame block is of edge absence whereas the present frame block is of edge presence, setting "change presence" if the absolute value of a DC component difference ($|BDC_{i-1} - BDC_i|$) is greater than or equal to the threshold value while alternatively setting "change absence" if it is less than the threshold value.

(3) Object Judging Unit

Figure 18:
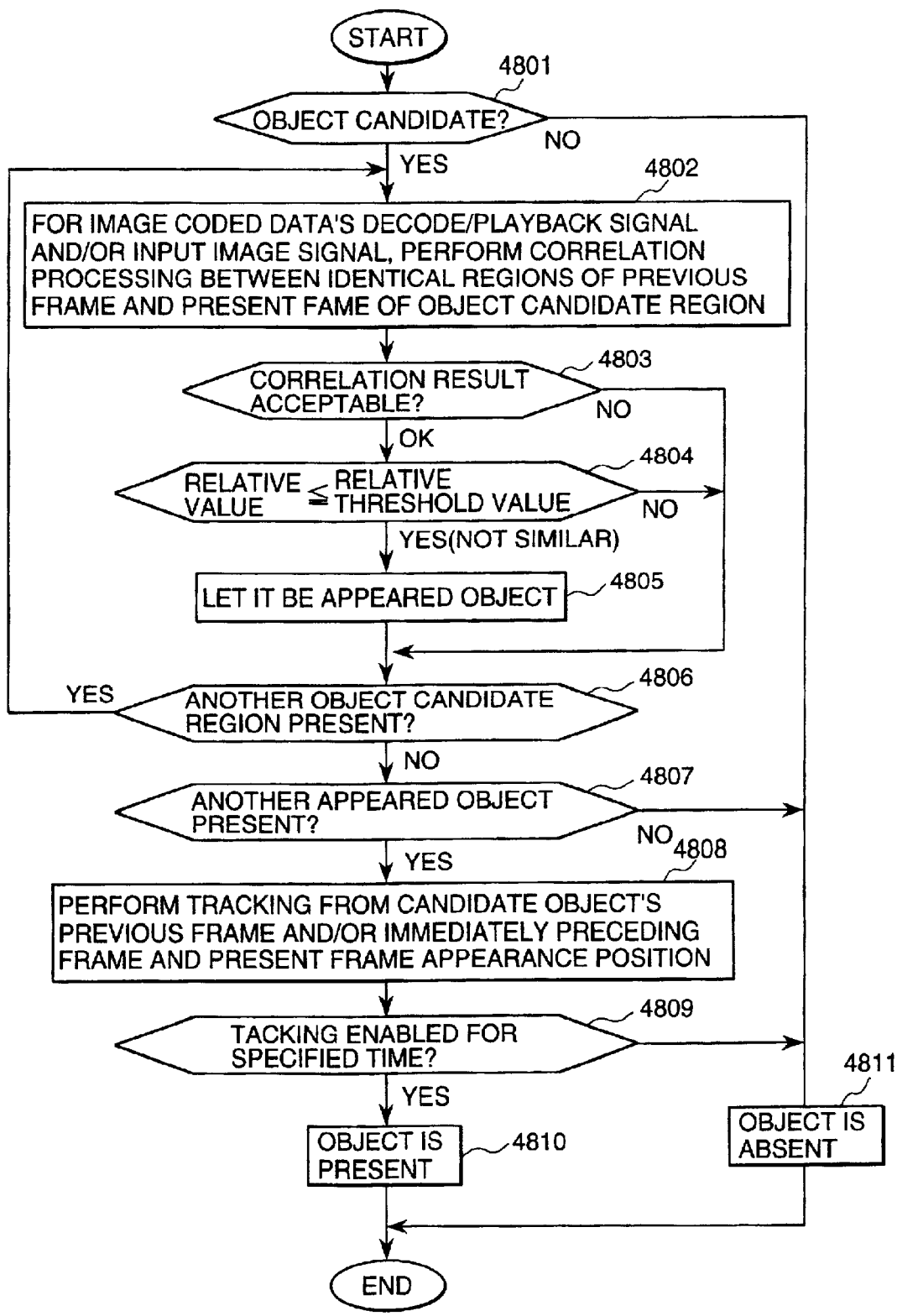
[FIG. 18] A flow diagram showing a processing procedure of an object judging unit of the embodiment 1.

A flow of processing of the object judging unit 4800 in this embodiment is shown in FIG. 18. First, the object judging unit 4800 checks a processing result of the object candidate extraction unit 4700 (at step 4801) and then permits the processing to proceed to step 4802 if a frame block being processed is a candidate of abnormal object. Here, in case it is not any abnormal object candidate, the object judging unit 4800 determines establishment of "abnormal object absence" (step 4811) and then terminates the processing.

At step 4802 the object judging unit 4800 performs, relative to image coded data's decoded reproduced signal and/or input image signal, correlation processing between identical regions of the previous frame and present frame of an abnormal object candidate region and/or a region which also includes the periphery of such abnormal object candidate region (also including the case of extension up to about plus/minus one pixel). Note that the previous frame may alternatively be either an immediately preceding frame or a reference frame.

The correlation processing to be executed here is numerical processing for digitalization through normalization correlation processing of Formula (Equation 2) with the presence/absence of correlation being as the degree of similarity. More specifically the object judging unit 4800 normalizes a respective one of luminance values of a preregistered template pattern and an image being processed to thereby obtain a difference of luminance therein (3F-8 Application of Variable-Density Pattern Matching Processing in Motor Vehicle Number Recognition System, 49-th National Conference of the Information Processing Society of Japan, Second Half Period of 1994).

Equation 2

$$r(u, v) = \left[ pq \sum_{i=0}^{p} \sum_{i=0}^{q} \{f(u+i, v+j) \times T(i, j)\} - \left\{ \sum_{i=0}^{p} \sum_{i=0}^{q} f(u+i, v+j) \sum_{i=0}^{p} \sum_{i=0}^{q} T(i, j) \right\} \right]^2 / \left[ pq \sum_{i=0}^{p} \sum_{i=0}^{q} f(u+i, v+j)^2 \left\{ \sum_{i=0}^{p} \sum_{i=0}^{q} f(u+i, v+j) \right\}^2 \right] \left[ pq \sum_{i=0}^{p} \sum_{i=0}^{q} T(i, j)^2 \left\{ \sum_{i=0}^{p} \sum_{i=0}^{q} T(i, j) \right\}^2 \right]$$
(2)

Note that in Formula (Equation 2) r(u,v) indicates the similarity in (u, v) coordinates, f(u+i, v+j) designates a photographic density value of an object image in close proximity to a (u, v) point, T(i,j) is a density value of a (i,j) point of the template image, and "p" and "q" denote x and y sizes of such template image, respectively.

Subsequently the object judging unit 4800 judges a result of the correlation processing at step 4802 (step 4803), thereby causing the processing to proceed to step 4806 in case any intended correlation is disabled while alternatively letting the processing go to step 4804 if the correlation is enabled. Note in the correlation processing that the correlation disability is a case where a region to be processed and correlated stays uniform in luminance with no edges present therein and is also a case where any specific characteristics are absent with less discrete values.

In the event that the correlation is possible, the object judging unit 4800 attempts to judge whether a correlation value is less than or equal to a correlative threshold value (step 4808). Here, if the correlation value is smaller than or equal to the threshold value to thereby mean that objects to be processed are not similar to each other (less in similarity), then the object judging unit 4800 regards an abnormal object candidate to be processed as an appeared object (step 4805) and then permits the processing to go to step 4806. Alternatively if at step 4804 the correlation value is greater than the threshold value to thereby tell that the abnormal object candidate to be processed is not any appeared object, then the object judging unit 4800 forces the processing to directly proceed to step 4806. Additionally the correlative threshold value used herein may be set at a value which falls within a range of from 0.0 to 1.0; for example, 0.7 is used as such threshold value in this embodiment.

At step 4806 the object judging unit 4800 checks to determine whether all available abnormal object candidates are completed in processing; in the case of incompleteness, let the processing return at step 4802 for execution of similar processing (steps 4802–4805) with respect to the next candidate region.

In the event that the processing has been completed relative to all available candidate regions at step 4806, the object judging unit 4800 judges whether an appeared object is found or not (step 4807). If no appeared objects are found then the object judging unit 4800 determines establishment of "abnormal object absence" (step 4811) and then terminates the processing.

Figure 19:
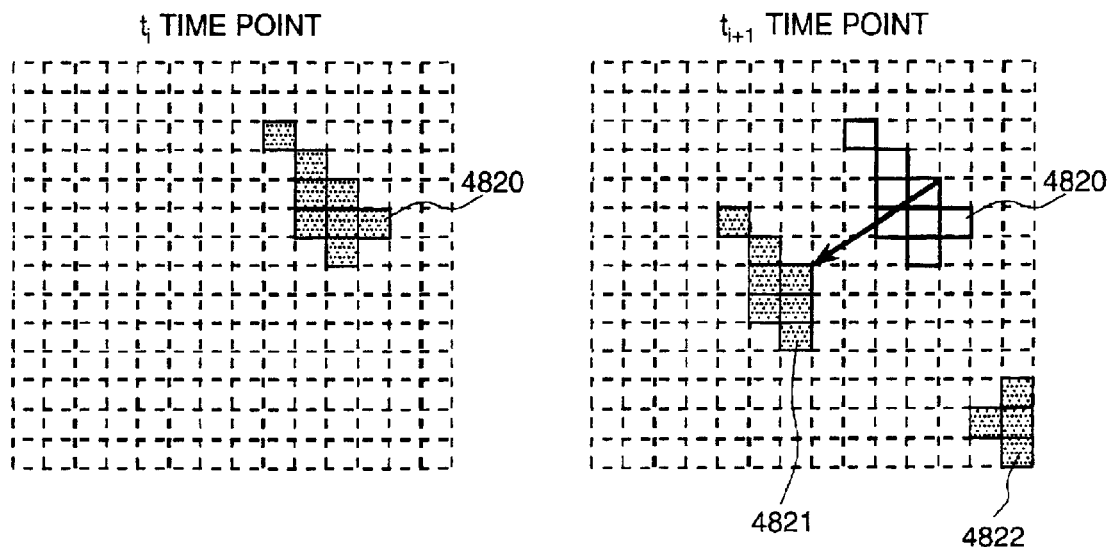
[FIG. 19] An explanation diagram showing tracking processing of a candidate object in the embodiment 1.

In case an appeared object is found, the object judging unit 4800 performs tracking from the appearance position of the candidate object's previous frame and/or immediately preceding frame and the appearance position of a present frame (step 4808) and then determines whether the tracking is made possible within a prespecified length of time period (step 4809). Here, for the tracking, a central point or the center of gravity of an abnormal object candidate region is employable as the appearance position, wherein the tracking is attainable by letting the nearest distance or the like correspond thereto. More specifically, the object judging unit 4800 operates in a way such that in case an abnormal object candidate 4820 appears at a time point ti and thereafter an abnormal object candidate 4821 and abnormal object candidate 4822 appear at an instant $t_{i+1}$ for example as shown in FIG. 19, this unit performs an abnormal object candidate tracking operation by causing the candidate 4821 that is an abnormal object candidate with a smaller movement distance to correspond to the abnormal object candidate 4820 under an interpretation that the abnormal object candidate 4820 has moved to the candidate 4821. This tracking is performed through sequentially repeated execution of judgment as to whether an abnormal object candidate is present or absent which is a result of movement of the same object within a frame while updating a newly input frame as a present frame to be processed.

When the tracking was enabled for a predetermined length of time period, the object judging unit 4800 determines establishment of "abnormal object presence" (step 4810) and then terminates the processing. Alternatively when the tracking was not enabled for the predetermined time period, the object judging unit 4800 determines establishment of "abnormal object absence" (step 4811) and then finishes the processing. Note here that the predetermined length of time period as used herein may be at or near the degree of a residence time of a specified object being detected in a photographed scene or alternatively be less than it (where, it must be greater than zero) as long as there is a time for enabling the detected object to be distinguished from any moving disturbances.

[EMBODIMENT 2]

Figure 2:
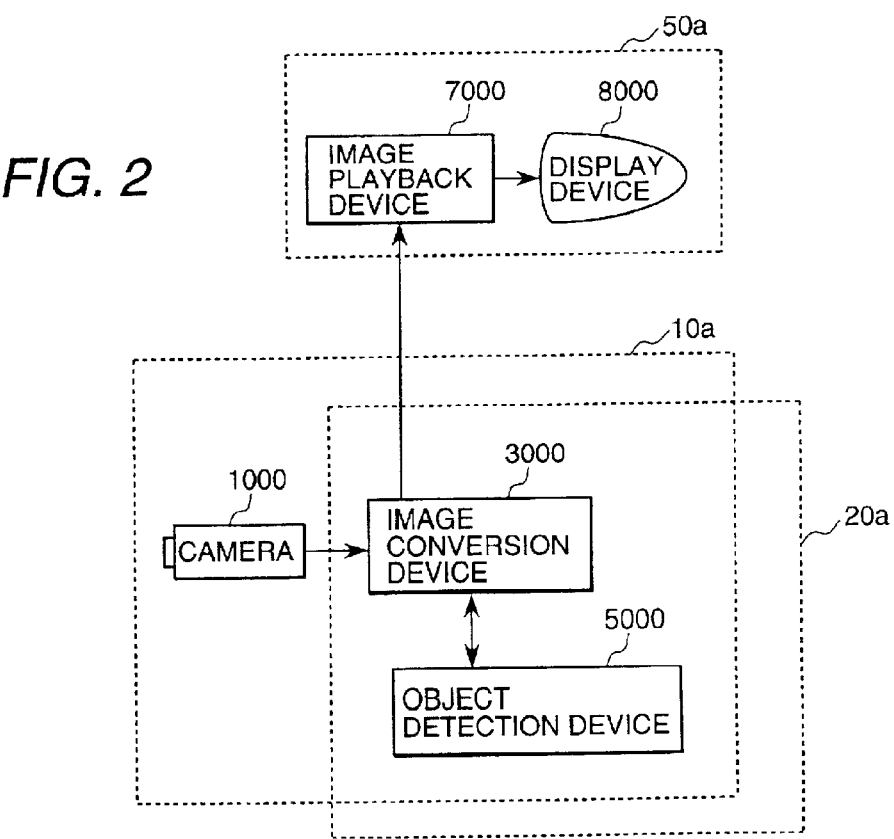
[FIG. 2] A function block diagram showing an image monitoring apparatus of an embodiment 2.

In the embodiment 1 discussed above, after once having coded image data by the image coding device 2000, an available abnormal object is detected at the object detection device 4000 and thereafter the image data will be decoded by the image decoding/playback device 6000 and then visually displayed at the image display device 8000. In contrast, this embodiment is arranged to offer an ability to display images using image data prior to image conversion or transformation as shown in FIG. 2. Additionally the image monitoring apparatus of this embodiment is substantially the same as the embodiment 1 with respect to the remaining points. In this respect, an explanation will here be given of only different points from the embodiment 1 with any explanation as to common points eliminated herein for brevity purposes.

In this embodiment the image monitoring apparatus is arranged as shown in FIG. 2 so that it includes a processing apparatus main body 10a and a decode-playback/display device 50 or alternatively a processing apparatus main body 20a, a camera 1000, and a decode-playback/display device 50a.

The processing apparatus main body 10a of this embodiment comprises the camera 1000 for capturing or photographing the scene of interest, an image conversion or transformation device 3000 for subdividing an image as input from the camera 1000 into a plurality of blocks and for performing orthogonal data transformation in units of blocks, and an object detection device 5000 for detection of any available abnormal objects. The decode-playback/display device 50a includes an image display device 8000 for visually displaying images and an image playback device 7000 for visually displaying any video image of the camera 1000 at the display device 8000. The camera 1000, image playback device 7000 and image display device 8000 may be arranged to employ prior known standard devices. A chip with the camera 1000 and the image transformation device 3000 integrated together may also be used.

As shown in FIG. 8, the image transformation device 3000 of this embodiment comprises a block region generation unit 3400 and a DCT data calculation unit 3500. The block region generation unit 3400 produces a plurality of blocks through subdivision of an image as photographed at the camera 1000 into unitary blocks of 8 pixels by 8 lines by way of example in order to perform orthogonal transformation on a per-block basis. The DCT data calculation unit 3500 performs luminance data orthogonal transformation from the information with subdivision into 8-pixel/8-line block units and then acquires frequency components.

It should be noted that although in this embodiment the orthogonal transformation for frequency component acquisition is the discrete cosine transformation (DCT) as indicated in Equation (1) described previously, orthogonal transformation excellent in degree of convergence to a low-frequency region may alternatively be employable, including orthogonal wavelet transform, K-L transform or the like. Additionally the subdivision to be done by the block region generation unit 3400 may alternatively be division into 16 pixels×16 lines or the like in place of 8 pixels×8 lines.

Figure 10:
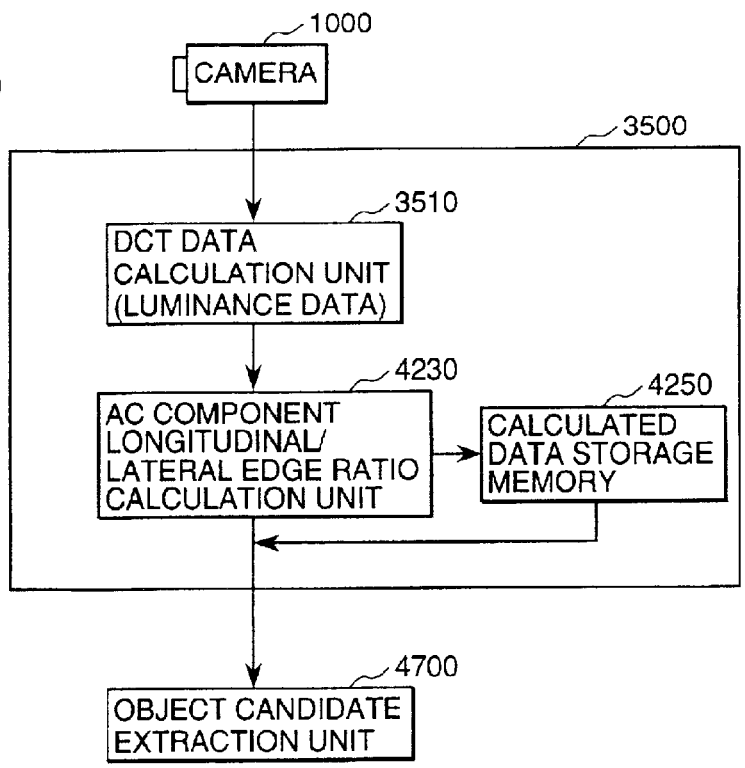
[FIG. 10] A function block diagram showing a DCT data calculation unit of the embodiment 2.

As shown in FIG. 10 the DCT data calculation unit 3500 of this embodiment includes a DCT data extraction unit 3510, AC component longitudinal-to-lateral edge ratio calculation unit 4230, and calculated data storage memory 4250. The DCT data extraction unit 3510 of this embodiment applies to the resultant luminance data in units of divided blocks the orthogonal transformation for frequency component acquisition—for example, discrete cosine transform (DCT) shown in Equation (1)—to thereby obtain a DCT coefficient. Using this, the AC component longitudinal/lateral edge ratio calculation unit 4230 calculates through computation a longitudinal/lateral edge ratio of an AC component and then stores the result in the calculated data storage memory 4250 in a way similar to that of the embodiment 1.

Figure 11:
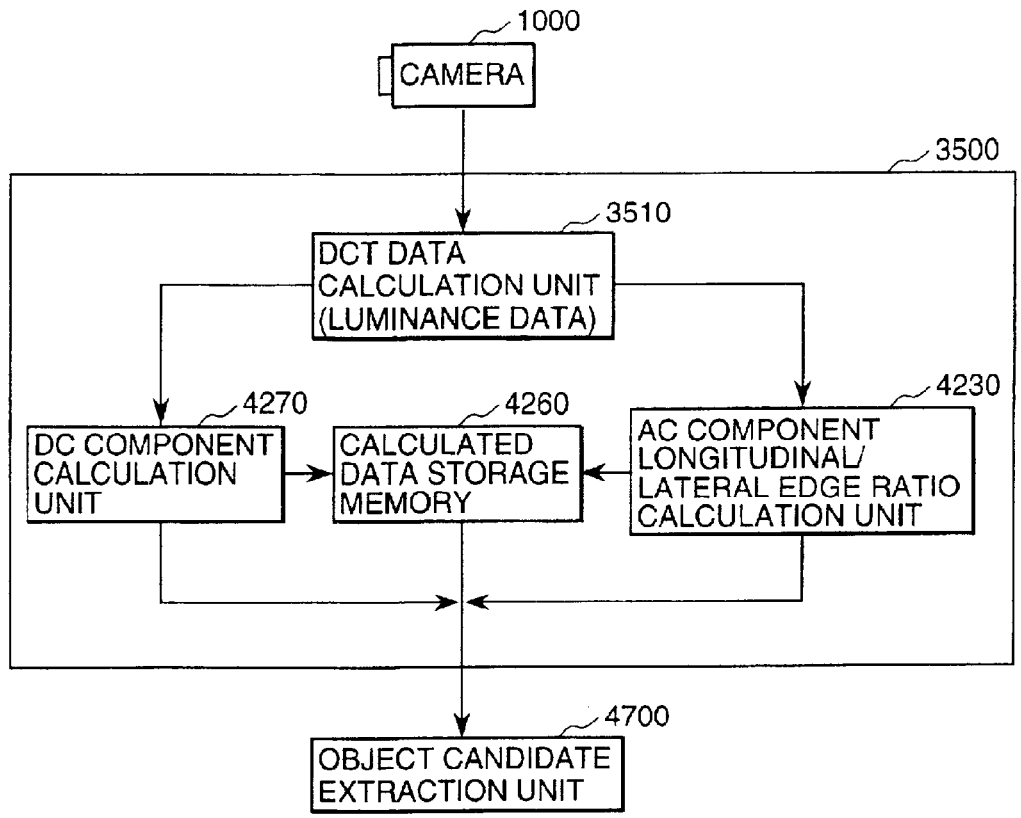
[FIG. 11] A function block diagram showing another example of the DCT data calculator unit of the embodiment 2.

It must be noted that as in the case of the embodiment 1, in this embodiment also, a DC component calculation unit 4270 may further be provided in the DCT data calculation unit 3500, wherein a DC component value which was calculated by this DC component calculation unit 4270 and then stored in the calculated data storage memory 4260 is used when the object candidate extraction unit 4700 extracts an abnormal object candidate(s). An arrangement of the DCT data calculation unit 3500 in this case is shown in FIG. 11.

Figure 9:
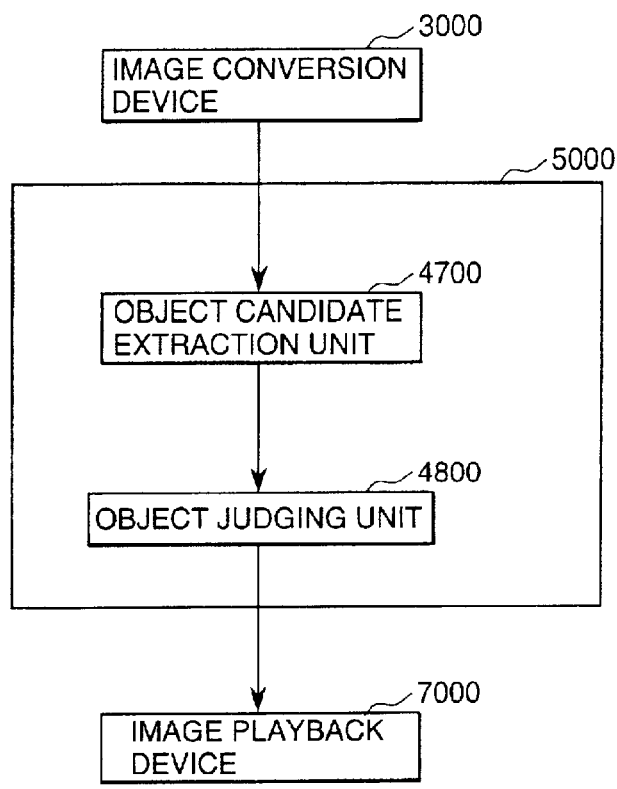
[FIG. 9] A function block diagram showing an object detector device of the embodiment 2.

Subsequently, using the frequency component of an image as has been acquired by the DCT data calculation unit 3500, the object detection device 5000 detects an abnormal object or objects. The object detection device 5000 of this embodiment also is an information processing apparatus in a similar manner to the object detection device 4000 of the embodiment 1, which comprises its object candidate extraction unit 4700 and object judging unit 4800 as shown in FIG. 9. Arrangements and functions of these respective units 4700, 4800 are similar to those of the embodiment 1.

Figure 21:
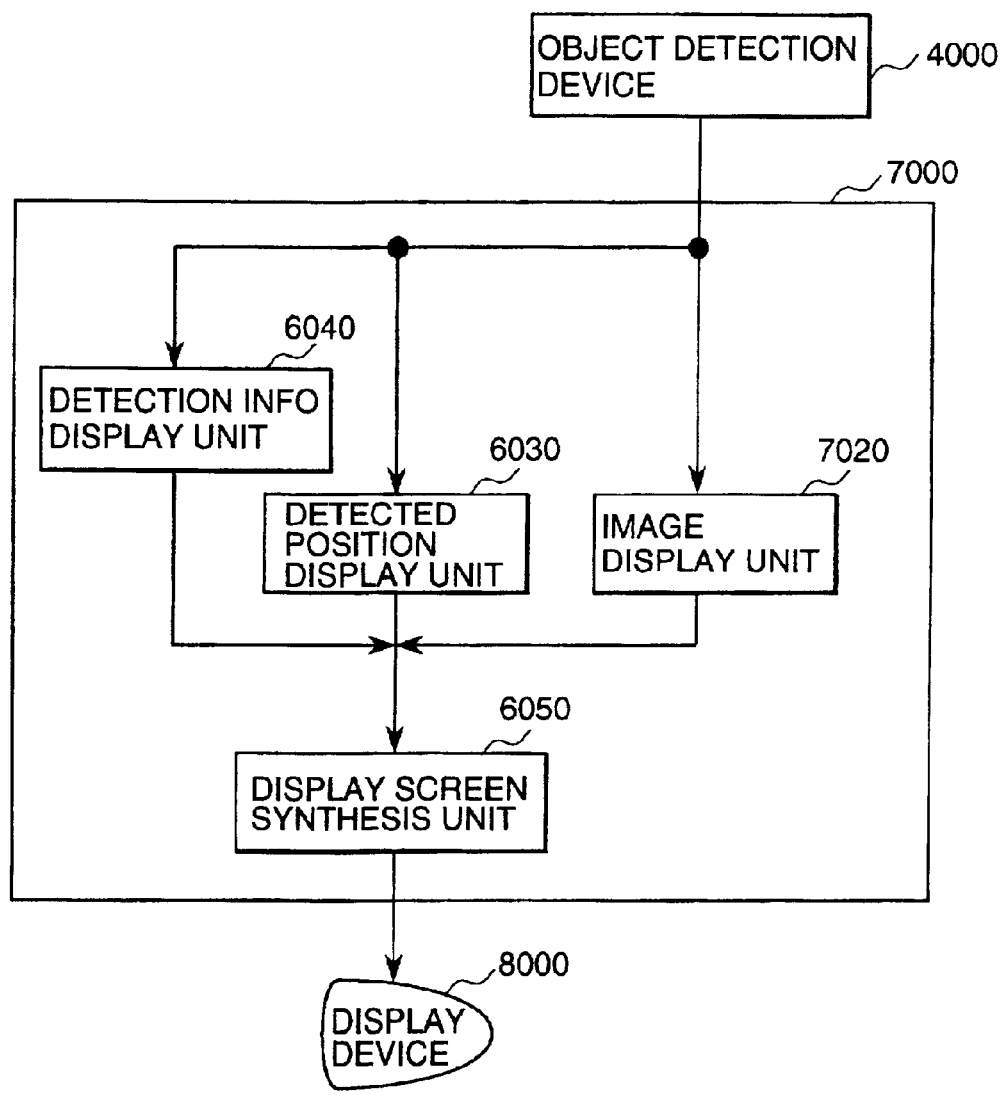
[FIG. 21] A function block diagram showing an image playback device of the embodiment 2.

A detection result due to this object detection device 5000 is displayed by the display playback device 7000 at the display device 8000. While the display playback device 7000 of this embodiment has a substantially similar arrangement to that of the image decoding/playback device 6000 of the embodiment 1, the image decoding unit 6010 is not provided therein as shown in FIG. 21. Due to this, an image display unit 7020 of this embodiment is operable to output an image signal as input from the camera 1000 toward the display screen synthesis unit 6050. The display screen synthesis unit performs, with respect to this image signal, pasting and/or composition of display data of the detection information display unit 6040 and the detected position display unit 6030 to thereby produce display data for enabling a watch person to visually judge and recognize any abnormal object information at a glance, and then displays the same at the display device 8000.

[EMBODIMENT 3]

Figure 22:
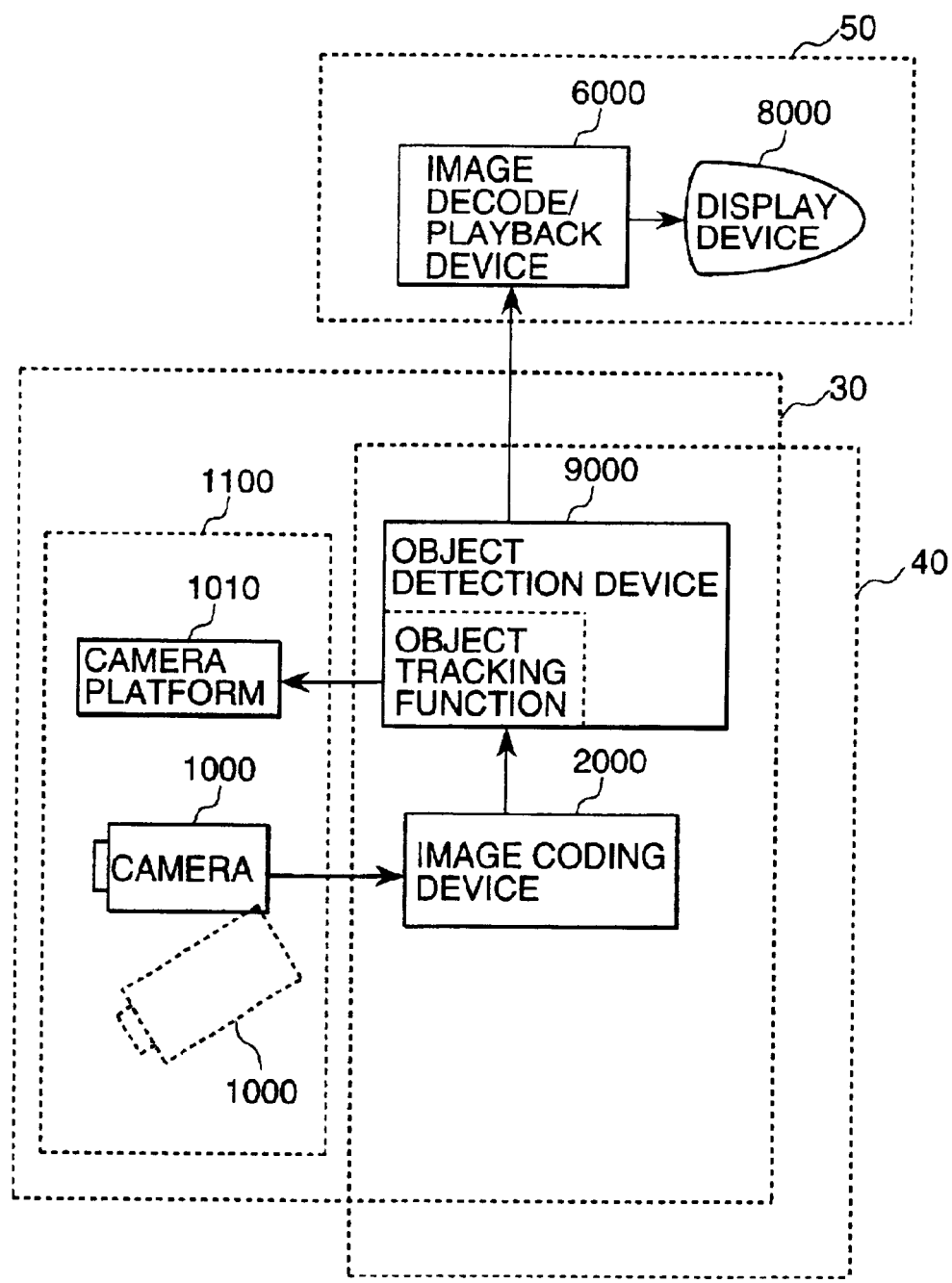
[FIG. 22] A function block diagram showing an image monitoring apparatus of an embodiment 3.

In this embodiment, an image monitoring apparatus is provided which is arranged to automatically track an abnormal object. As shown in FIG. 22, the image monitoring apparatus of this embodiment comprises a processing apparatus main body 30 along with a decode-playback/display device 50 similar to that of the embodiment 1. The processing apparatus main body 30 of this embodiment includes an image pickup/capturing or "photographing" device 1100, image coding device 2000, and object detection device 9000 with object tracking functionality. In this embodiment also, the image monitoring apparatus may be made up from a processing apparatus main body 40, image capturing device 1100 and playback/display device 50 while letting the image capture device be excluded from the processing apparatus main body as in the other embodiments.

The image monitoring apparatus of this embodiment has the substantially the same arrangement as that of the image monitoring apparatus of the embodiment 1, except that the former has as an image capturing or photographing mechanism in addition to the camera 1000 a driving mechanism for changing or altering its optical axis direction and also that the object detection device 9000 has object tracking functionality. In light of this, an explanation will here be given of only different points from the embodiment 1 with any explanation as to common points eliminated herein.

The image pickup/capture device 1010 has a camera 1000 and a mount base 1100, also known as "camera platform," with the camera mounted thereon. The camera platform 1010 has an angle alteration mechanism for changing and adjusting an angle in the optical axis direction of a lens(es) of the attached camera 1000 being mounted thereon. Note that the image capture device 1100 may be a prior known camera having a drivable camera platform.

Figure 23:
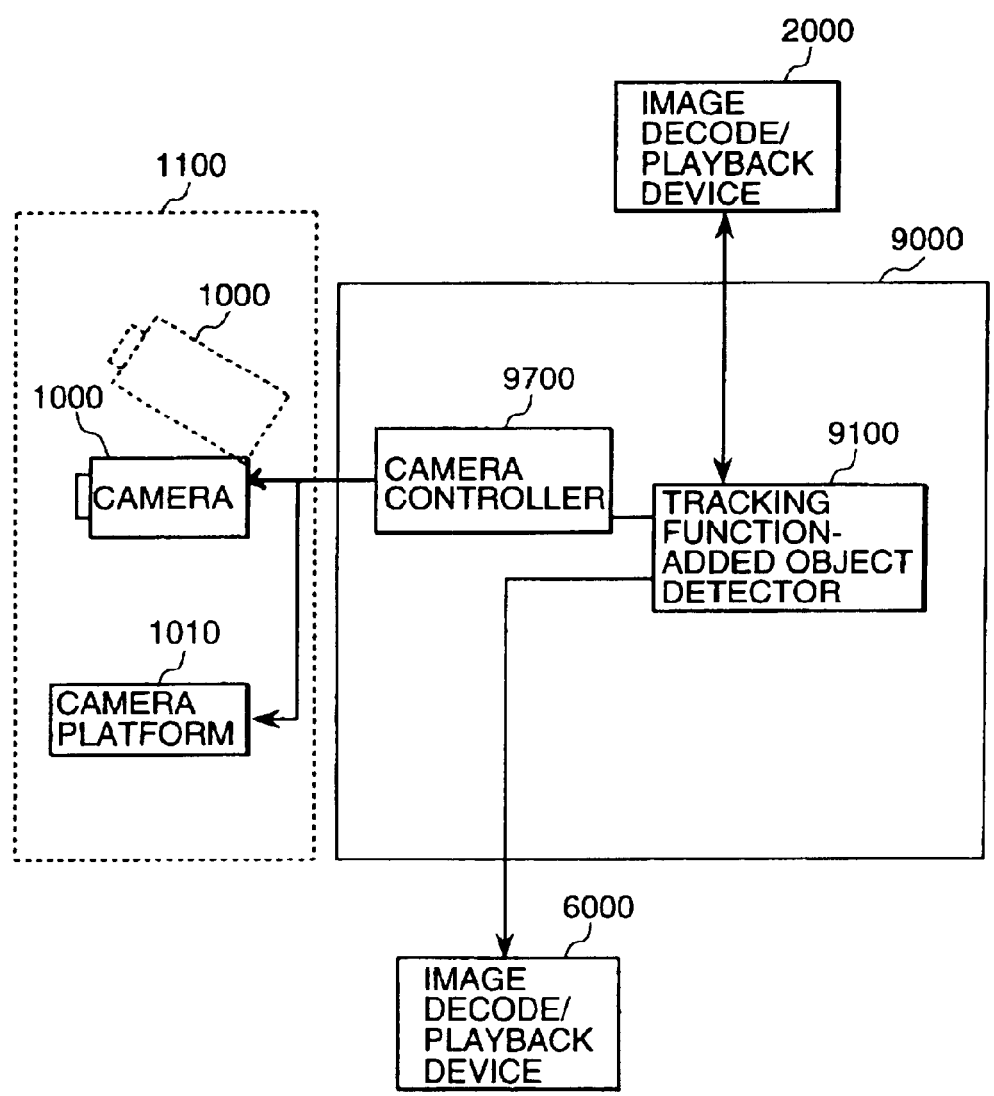
[FIG. 23] A function block diagram showing an object tracking function-added object detection device of the embodiment 3.
Figure 24:
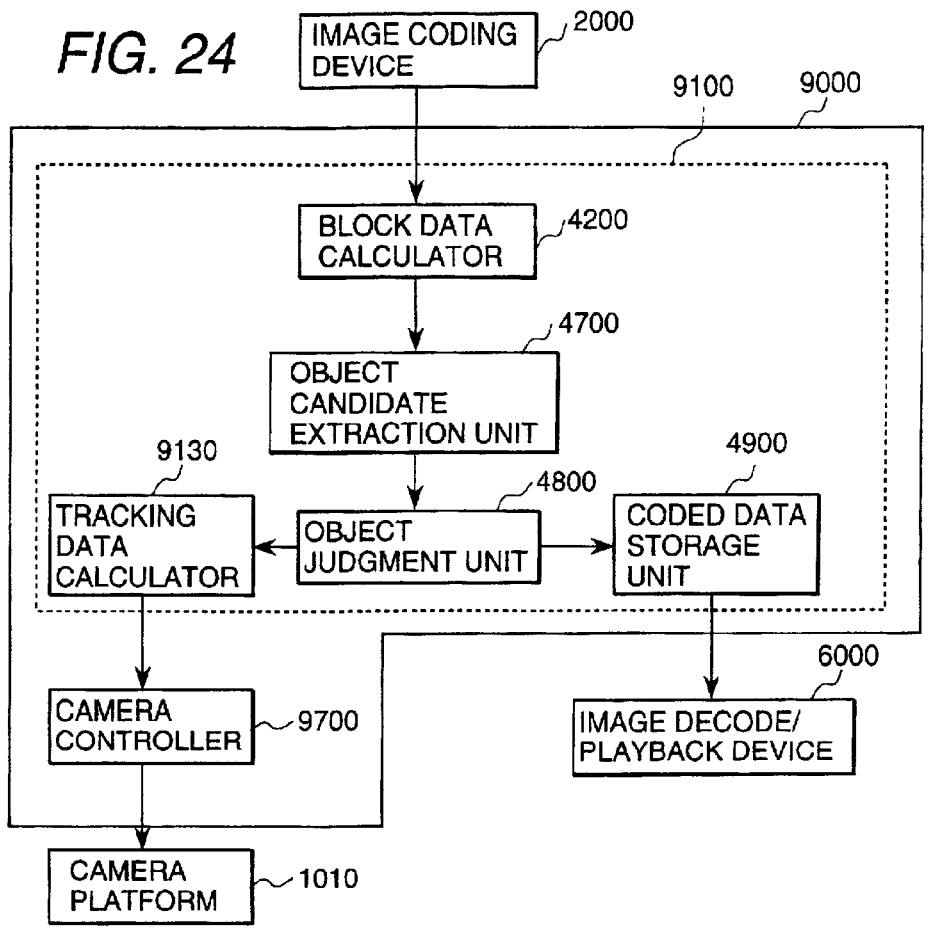
[FIG. 24] A function block diagram showing a tracking function-added object detection unit of the embodiment 3.

Additionally as shown in FIG. 23, the object detection device 9000 of this embodiment has a tracking function-added object detection unit 9100 and a camera control unit 9700. The camera control unit 9700 is connected via communication links to the camera platform 1010 of the image capture device 1100 for outputting more than one control signal as used to control an operation of the driving mechanism of the platform 1010 and an operation of the camera 1000. As shown in FIG. 24 the tracking function-added object detection unit 9100 further has a tracking data calculation unit 9130 in addition to a similar arrangement to the object detection device 4000 of the embodiment 1, which is operable to calculate tracking-use data including but not limited to the horizontal movement amount and/or vertical movement amount of an abnormal object as detected by the object judging unit 4800 and then notify it to the camera control unit 9700. The camera control unit 9700 which has received this operates to convert the input tracking-use data into a control signal for use with the image capture device 1100 and then output it toward the camera platform 1010.

With such an arrangement, this embodiment enables the image capture device 1100 to sense and capture or "photograph" a scene with continuous tracking of an abnormal object(s) thus detected.

Figure 25:
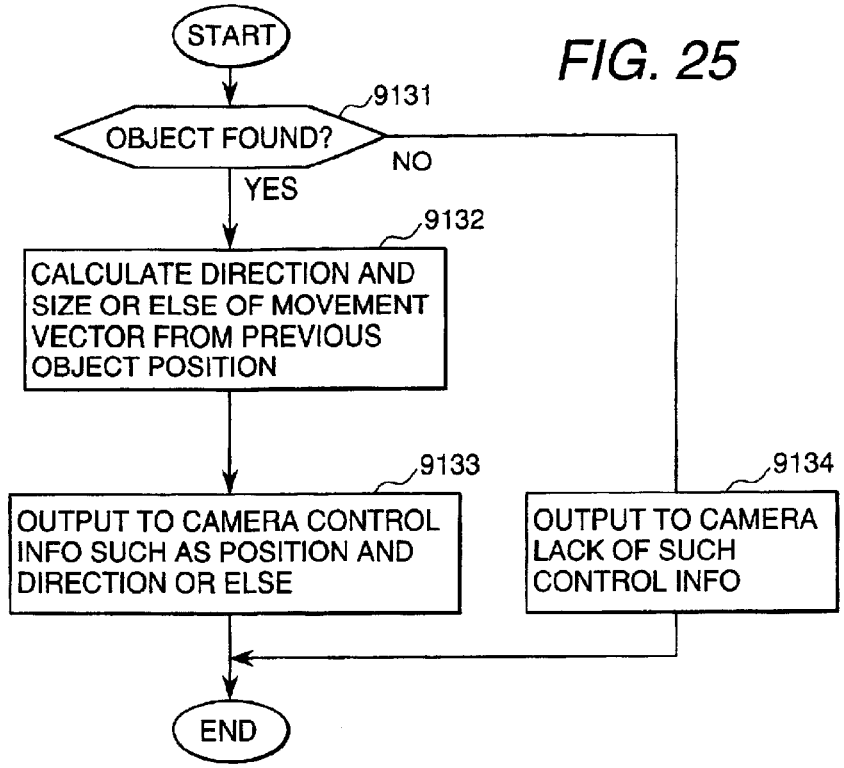
[FIG. 25] A flow diagram showing a processing procedure of a tracking data calculation unit in the embodiment 3.

A practically reduced processing procedure of the tracking data calculation unit 9130 will be explained with reference to FIG. 25. Firstly, the tracking data calculation unit 9130 checks for the presence or absence of an abnormal object (at step 9131). In the event that the object judging unit determines an abnormal object is present, the tracking data calculation unit 9130 calculates, as the direction and size of a moving vector, a horizontal direction movement amount and/or vertical direction movement amount or the like up to a central point or a gravity center position or else of a detected object in a present frame from the center or gravity center position or else of the detected object in a previous frame (at step 9132), and then outputs through the camera control unit 9700 toward the camera platform 1010 certain control data such as the camera's panning and/or tilting or the like corresponding to the calculated horizontal direction movement amount and/or vertical direction movement amount 1010 (step 9133). On the other hand, in case judgment is made saying that any object is absent at the step 9131, the tracking data calculation unit 9130 outputs via the camera control unit 9700 to the camera platform 1010 specific control data indicative of the lack of any control information (step 9134).

It should be noted that in the case of the presence of a plurality of objects, if multiple cameras are employed each of which is similar in arrangement to the camera 1000, then it is possible to let a single camera correspond to a single object. Alternatively in case the camera 1000 is used singularly, a scheme may be used for determining an object to be tracked in accordance with a prespecified order of priority.

[EMBODIMENT 4]

An image monitoring apparatus of this embodiment is designed to create, upon detection of an abnormal object (moving object), additive information corresponding to such detected object and then visually display it at a display device along with an image of the abnormal object. In addition the image monitoring apparatus of this embodiment is provided with a communication function for performing communication with a troubleshooting person who is responsible for handling accidents and problems occurring in his or her territory or "job site."

Figure 26:
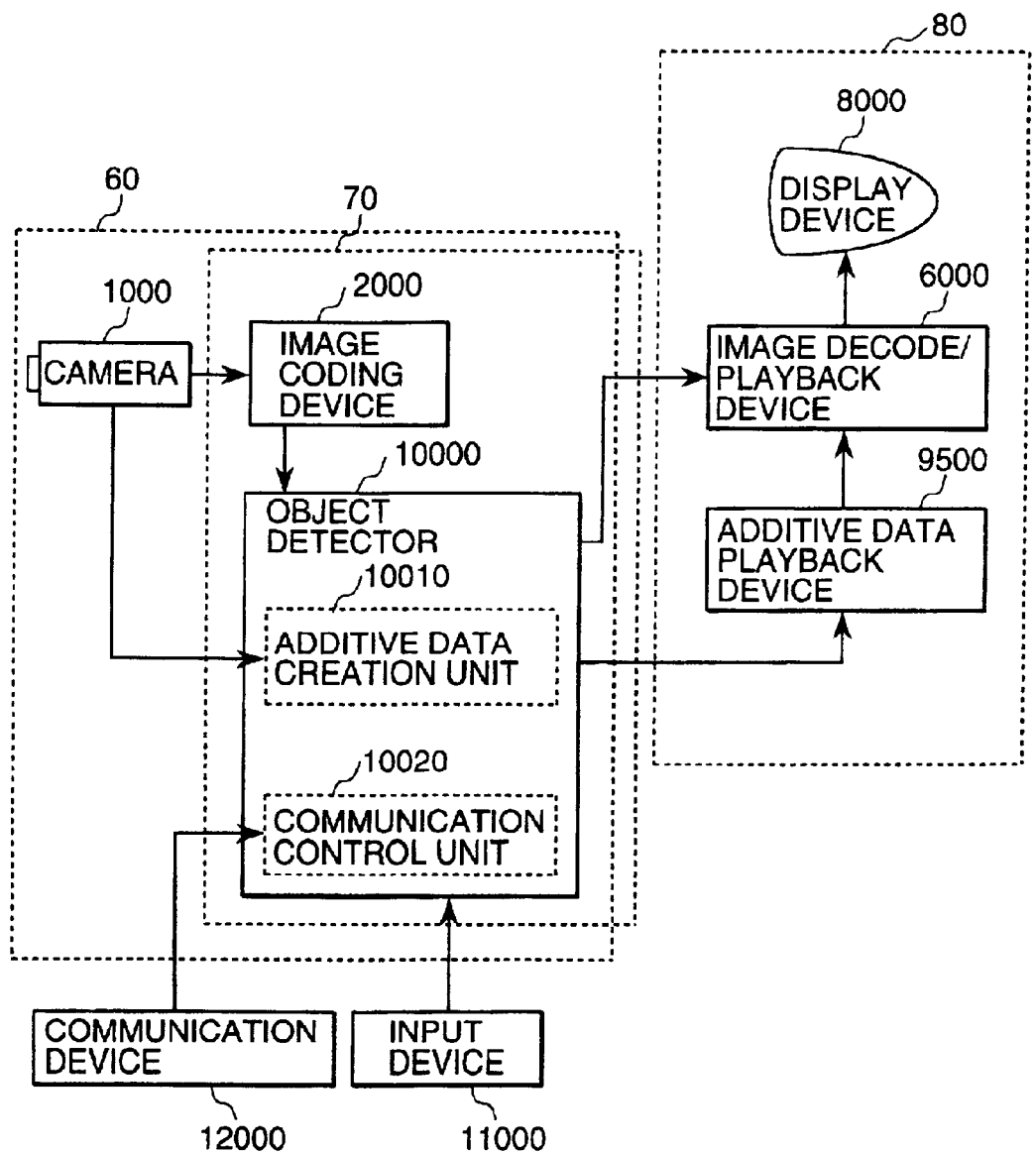
[FIG. 26] A function block diagram showing an image monitoring apparatus of an embodiment 4.

As shown in FIG. 26 the image monitoring apparatus of this embodiment comprises a processing apparatus main body 60 having a camera 1000 and an image coding device 2000 plus additive data creation function-added object detection device 10000, a playback/display device 80 which has an image decoding/playback device 6000 and image display device 8000 and further has an additive data playback device 9500 in addition thereto, an input device 11000, and a communication device 12000. In this embodiment also, the image monitoring apparatus may be constituted from a processing apparatus main body 70, camera 1000, playback/display device 80, input device 11000 and communication device 12000 while letting the camera be excluded from the processing apparatus main body as in the other embodiments.

The image monitoring apparatus of this embodiment has an additive data creation unit 10010 in the object detection device 10000 for the purpose of displaying additive data concerning an abnormal object(s) thus detected, wherein the additive data playback device 9500 for visual display of additive data as created thereby is provided in the playback/ display device 80. Additionally it comprises the input device 11000 and communication device 12000 for use as the mechanism for communication with any abnormality occurrence job sites, with a communication control unit 10020 being provided in the object detection device 10000. Except for these points, the image monitoring apparatus of this embodiment has an almost similar arrangement to that of the apparatus of the embodiment 1. In light of this, an explanation will here be given of only different points from the embodiment 1 with any explanation as to common points eliminated herein.

Figure 27:
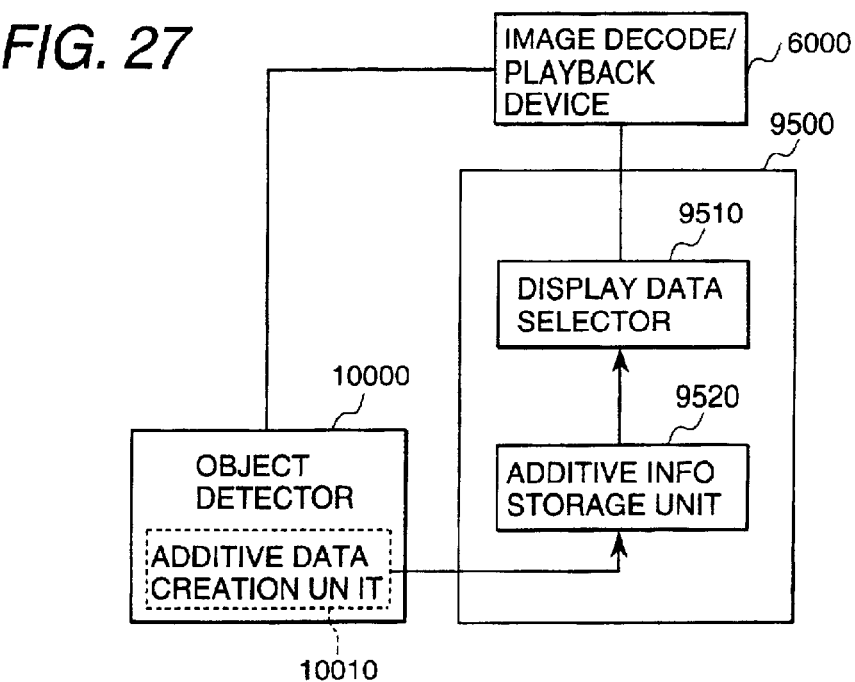
[FIG. 27] A function block diagram showing an additive data playback device of the embodiment 4.

As shown in FIG. 26 the object detection device 10000 of this embodiment has the additive data creation unit 10010 and communication control unit 10020 in addition to a similar arrangement to the object detection device 4000 of the embodiment 1. In addition, as shown in FIG. 27, the additive data playback device 9500 of this embodiment has a display data selection unit 9510 and additive information storage unit 9520. Note that although in this embodiment the additive data playback device 9500 is provided in the playback/display device 80, it may alternatively be provided in the processing apparatus main body 60 per se or still alternatively provided in the object detection device 10000. Also note that although the communication control unit 10020 is provided in the object detection device 10000, the same may alternatively be provided in another device such as the communication device 12000.

The additive data creation unit 10010 creates and produces, with respect to any abnormal object as detected by the object judging unit 4800, additional data items including but not limited to a nickname of the detected object, photograph scene title, abnormal object detection time point, position within the object's scene, object area, object's characteristics (such as taller-than-wide, wider-than-tall, dark object, bright object, etc.), icon and the like, and then stores them in the additive information storage unit 9520 of the additive data playback device 9500. The display data selection unit 9510 selects, with respect to the scene of interest to be displayed at the display device 8000, certain ones to be displayed from among the additive information items as held in the additive information storage unit 9520 and then sends forth them toward the image decoding/ playback device 6000 to thereby permit visual display on the display screen of the display device 8000.

Figure 28:
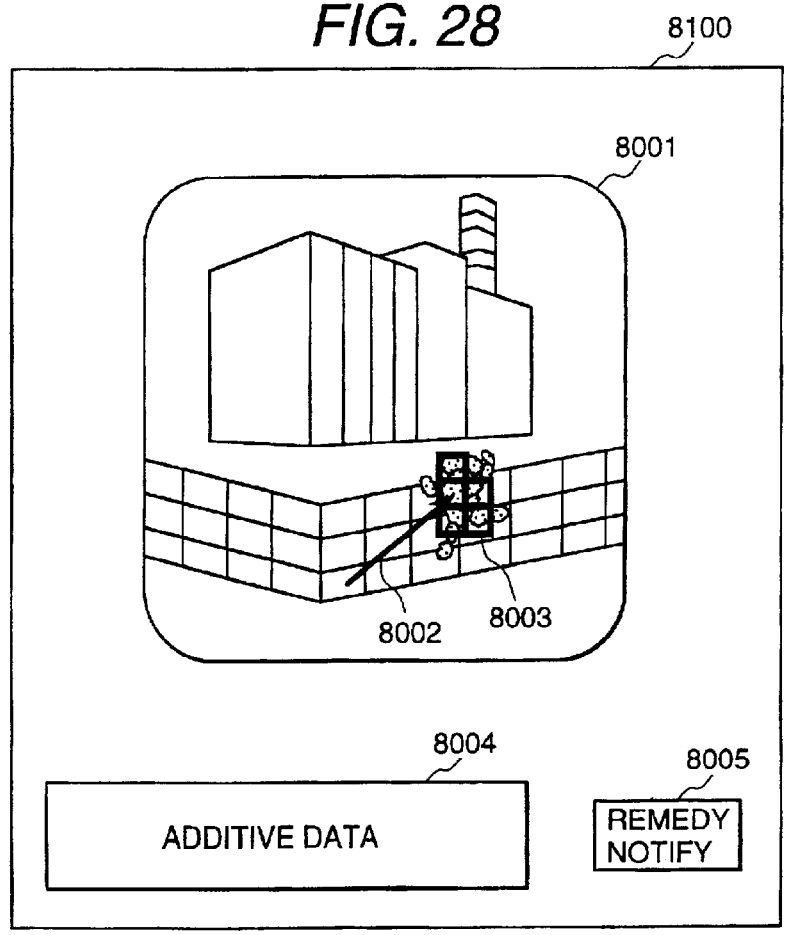
[FIG. 28] An explanation diagram showing a display screen example of a display device in the embodiment 4.

A display screen example of the display device 8000 in this embodiment is shown in FIG. 28. The image monitoring apparatus of this embodiment operates in a way such that in the event that an abnormal object (moving object) is detected, it visually displays on a display screen 8100 a vector 8002 indicative of movement of the abnormal object relative to a previous frame and additional data 8004 of the detected scene as created by the additive data playback device 9500 in addition to a scene 8001 in which the abnormal object is being captured or "photographed." Whereby, it becomes possible for a watch person who is the user of this apparatus to readily recognize at a glance the additive information of any abnormal scenes.

Further with the image monitoring apparatus of this embodiment, there is provided an interface for enabling bidirectional communication with a troubleshooting person at any occurrence location. More specifically an image being displayed in this embodiment is provided with a selection region (button) 8005 for support of remedy notification. Upon selecting (clicking) of this region 8005 via the input device 11000, the communication control unit 10020 selects from among pre-registered communication destinations an appropriate communication destination which is nearest to the abnormal object being presently displayed and then opens a communication link (such as a over-the-air communication line for portable or handheld wireless telephone handsets) with the communication destination. This in turn enables the watch person who is the user of this image monitoring apparatus to perform bidirectional communication with a troubleshooter at any abnormality occurrence location or job site.

In accordance with the present invention, the longitudinal/lateral edge ratio of a frequency component of "rare" image data with compression-coding processing applied thereto is utilized to perform judgment as to whether an abnormal object candidate is present or absent by use of a change rate of the edge ratio between a previous frame and a present frame. Accordingly, as comparison is done between such two frames by utilizing the longitudinal/lateral edge ratio of the frequency component, there is an effect of enabling significant reduction of a processing time and memory while at the same time offering an effect that any appreciable influence depending on luminance variation does no longer occur due to the use of the edge ratio. In addition, since the processing is done with no extra modification applied to the image's compression-coded data, there is a "double" effect which follows: it is possible to shorten an image processing time while further making it possible to shorten a time taken to perform the intended image transfer. Additionally, as the correlation processing is used for abnormal object judgment, there is an effect that the abnormality judgment much increases in precision. On the other hand, in the case of using one or more platform-attached cameras, object tracking is performed; thus, it is possible to photograph a wider range with a less number of cameras, which in turn makes it possible to establish a system arrangement at low costs.

What is claimed is:

1. An image monitoring apparatus characterized by comprising:
    means for subdividing an image as input from an image capturing device into blocks;
    an object candidate extraction unit operable to compare image data of a frame to be processed with image data of its immediately preceding frame in units of the blocks to thereby extract more than one abnormal object candidate in accordance with edge presence/absence and longitudinal-to-lateral edge ratio change rates; and
    an object judging unit for determination of whether said abnormal object candidate is an abnormal object or not, wherein
    said object judging unit is operable to determine the abnormal object candidate as an abnormal object in case this candidate is kept traceable for a prespecified length of time period.

2. The image monitoring apparatus as recited in claim 1, characterized in that said object candidate extraction unit extracts the abnormal object candidate based on a change with time in frequency component as acquired through execution of orthogonal transformation of the block data.

3. The image monitoring apparatus as recited in claim 2, characterized in that said orthogonal transformation is discrete cosine transform or orthogonal wavelet transform.

4. The image monitoring apparatus as recited in claim 1 or 2, characterized by further having:
    a tracking data calculation unit for tracking of an abnormal object as detected by said object judging unit; and
    an image capture device controller for generating and outputting based on the tracking data an image capture device-use control signal for changing an angle of an optical axis of said image capturing device.

5. The image monitoring apparatus as recited in claim 4, characterized in that said tracking data at least includes at least either one of a movement amount of said abnormal object in a horizontal direction and a movement amount thereof in a vertical direction.

6. The image monitoring apparatus as recited in claim 5, characterized in that the image capture device-use control signal includes a control signal pursuant to a change amount of the optical axis angle of said image capturing device as has been converted through calculation from the movement amount of said abnormal object.

7. The image monitoring apparatus as recited in any one of the preceding claims 1 or 2, characterized by further having:
    an additive data creation unit for creation of display-use information as to the abnormal object thus detected.

8. The image monitoring apparatus as recited in any one of the preceding claims 1 or 2, characterized by further comprising:
    an input device operatively associated with a communication device; and
    a communication control unit operatively responsive to receipt of an instruction as input through said input device for performing communication with respect to at least one of predefined communication destinations via said communication device.

9. An image monitoring method characterized by comprising the steps of:
    subdividing an image as input from an image capturing device into blocks;
    comparing image data of a frame to be processed with image data of its immediately preceding frame in units of the blocks to thereby extract more than one abnormal object candidate in accordance with edge presence/absence and longitudinal/lateral edge ratio change rates; and
    determining whether said abnormal object candidate is an abnormal object, wherein
    said step of determining includes a step of judging the abnormal object candidate as an abnormal object in case this candidate is kept traceable for a prespecified length of time period.

10. A computer-readable storage medium characterized by holding therein a computer program for realization of the image monitoring method as recited in claim 9.

* * * * *